(12) United States Patent
Potharaju et al.

(10) Patent No.: US 10,489,463 B2
(45) Date of Patent: Nov. 26, 2019

(54) FINDING DOCUMENTS DESCRIBING SOLUTIONS TO COMPUTING ISSUES

(71) Applicant: Microsoft Technology Licensing, LLC, Redmond, WA (US)

(72) Inventors: Rahul Potharaju, Sammanmish, WA (US); Navendu Jain, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 454 days.

(21) Appl. No.: 14/620,378

(22) Filed: Feb. 12, 2015

(65) Prior Publication Data

US 2016/0239487 A1    Aug. 18, 2016

(51) Int. Cl.
*G06F 16/00* (2019.01)
*G06F 16/93* (2019.01)
*G06F 16/2457* (2019.01)

(52) U.S. Cl.
CPC ........ *G06F 16/93* (2019.01); *G06F 16/24578* (2019.01)

(58) Field of Classification Search
CPC ........... G06F 17/30011; G06F 17/3053; G06F 17/30542; G06F 17/30533; G06F 16/93; G06F 16/24578
USPC ......................................................... 707/749
See application file for complete search history.

(56) References Cited

U.S. PATENT DOCUMENTS

| | | | |
|---|---|---|---|
| 5,974,412 A * | 10/1999 | Hazlehurst | G06F 16/3332 |
| 6,269,368 B1 * | 7/2001 | Diamond | G06F 16/3329 |
| 6,374,241 B1 * | 4/2002 | Lamburt | G06F 16/954 |
| 7,080,141 B1 | 7/2006 | Baekelmans et al. | |
| 7,171,337 B2 | 1/2007 | Yuan et al. | |
| 7,191,364 B2 | 3/2007 | Hudson et al. | |
| 7,324,986 B2 | 1/2008 | Aaron | |
| 7,499,914 B2 * | 3/2009 | Diab | G06Q 30/0256 |
| 7,681,182 B1 | 3/2010 | Mistry et al. | |
| 7,698,331 B2 * | 4/2010 | Carson, Jr. | G06F 16/951 707/728 |
| 8,014,997 B2 * | 9/2011 | Huang | G06F 17/2735 704/7 |
| 8,112,667 B2 | 2/2012 | Belluomini et al. | |
| 8,296,311 B2 | 10/2012 | Rapp et al. | |

(Continued)

OTHER PUBLICATIONS

"Second Written Opinion Issued in PCT Application No. PCT/US2016/015494", dated Jan. 20, 2017, 8 Pages.

(Continued)

*Primary Examiner* — Thanh-Ha Dang
(74) *Attorney, Agent, or Firm* — Drinker Biddle & Reath LLP

(57) ABSTRACT

When a computing device has an issue, a detector receives (or retrieves) data associated with the computing device. The data may include parameter key-value pairs. The detector creates queries based on the data and distributes the queries to one or more matching engines, such as an exact matching engine or a proximity matching engine. The one or more matching engines look for matches in an index of database documents. The results from the one or more matching engines are ranked based on relevancy scores. In some cases, users may provide feedback regarding the relevancy of the results and the feedback may be used to recalibrate how the relevancy scores are determined.

19 Claims, 12 Drawing Sheets

(56) References Cited

U.S. PATENT DOCUMENTS

| | | | |
|---|---|---|---|
| 8,495,002 B2 | 7/2013 | Nelken et al. | |
| 8,504,553 B2* | 8/2013 | Vailaya | G06F 16/334 707/711 |
| 8,583,632 B2* | 11/2013 | Libes | G06Q 10/10 707/723 |
| 8,732,158 B1 | 5/2014 | Hundt | |
| 8,930,881 B1* | 1/2015 | Eddins | G06F 8/22 717/100 |
| 2004/0068497 A1* | 4/2004 | Rishel | G06F 16/3338 |
| 2006/0089926 A1* | 4/2006 | Knepper | G06F 16/313 |
| 2006/0184342 A1 | 8/2006 | Narain | |
| 2007/0112714 A1* | 5/2007 | Fairweather | G06F 8/427 706/46 |
| 2007/0156677 A1* | 7/2007 | Szabo | G06F 21/6245 |
| 2007/0239760 A1* | 10/2007 | Simon | G06Q 10/06 |
| 2008/0140566 A1* | 6/2008 | Chowins | G06Q 20/10 705/39 |
| 2008/0208820 A1* | 8/2008 | Usey | G06F 16/313 |
| 2008/0263032 A1* | 10/2008 | Vailaya | G06F 16/334 |
| 2008/0288266 A1* | 11/2008 | Diao | G06Q 10/10 705/1.1 |
| 2009/0006360 A1* | 1/2009 | Liao | G06F 16/284 |
| 2009/0216563 A1* | 8/2009 | Sandoval | G06Q 30/02 705/3 |
| 2010/0121869 A1* | 5/2010 | Biannic | G06F 16/283 707/759 |
| 2010/0131563 A1* | 5/2010 | Yin | G06F 16/338 707/794 |
| 2010/0250336 A1* | 9/2010 | Selinger | G06Q 30/02 705/26.7 |
| 2010/0299326 A1* | 11/2010 | Germaise | G06F 16/9535 707/728 |
| 2011/0004588 A1* | 1/2011 | Leitersdorf | G06F 16/951 707/711 |
| 2012/0011112 A1* | 1/2012 | Bian | G06F 16/951 707/723 |
| 2014/0189572 A1* | 7/2014 | Martens | G06F 3/04817 715/780 |
| 2015/0169582 A1* | 6/2015 | Jain | G06F 16/24578 707/748 |
| 2015/0317320 A1* | 11/2015 | Miller | G06F 16/248 707/728 |
| 2015/0356086 A1* | 12/2015 | Kamotsky | G06F 16/24578 707/731 |
| 2015/0379000 A1* | 12/2015 | Haitani | G06F 16/5838 707/745 |
| 2019/0197036 A1* | 6/2019 | Miller | G06F 16/248 |

OTHER PUBLICATIONS

Kohavi, Ron, "A Study of Cross-Validation and Bootstrap for Accuracy Estimation and Model Selection", In Proceedings of the 14th International Joint Conference on Artificial Intelligence, Aug. 20, 1995, 7 pages.
Yin, et al., "An Empirical Study on Configuration Errors in Commercial and Open Source Systems", In Proceedings of the 23rd ACM Symposium on Operating Systems Principles, Oct. 23, 2011, pp. 159-172.
Joty, Shafiq Rayhan., "Answer Extraction for Simple and Complex Questions", In Thesis of Master of Science, Retrieved on: Sep. 15, 2014, 224 Pages.
"Apple Knowledge Base", Retrieved on: Sep. 23, 2014, Available at: http://support.apple.com/kb/index?page=search&locale=en_US &q=.
Su, et al., "AutoBash: Improving Configuration Management with Operating System Causality Analysis", In Proceedings of 21st ACM SIGOPS Symposium on Operating Systems Principles, Oct. 14, 2007, pp. 237-250.
Zhang, et al., "Automated Diagnosis of Software Configuration Errors", In Proceedings of International Conference on Software Engineering, May 18, 2013, pp. 312-321.
Yuan, et al., "Automated Known Problem Diagnosis with Event Traces", In Proceedings of the 1st ACM SIGOPS/EuroSys European Conference on Computer Systems, Apr. 18, 2006, pp. 375-388.
Wang, et al., "Automatic Misconfiguration Troubleshooting with Peerpressure", In Proceedings of the 6th Conference on Symposium on Opearting Systems Design & Implementation, Dec. 6, 2004, 13 pages.
Su. et al., "Automatically Generating Predicates and Solutions for Configuration Troubleshooting", In Proceedings of the conference on USENIX Annual technical conference, Jun. 14, 2009, 13 Pages.
Attariyan. et al., "Automating Configuration Troubleshooting with Dynamic Information flow Analysis", In Proceedings of the 9th USENIX conference on Operating systems design and implementation, Oct. 4, 2010, 14 Pages.
Bounimova, et al., "Billions and Billions of Constraints: Whitebox Fuzz Testing in Production", In Proceedings of International Conference on Software Engineering, May 18, 2013, pp. 122-131.
U.S. Appl. No. 14/106,762, Chan, et al., "Building Features and Indexing from Text for Knowledge-Based Matching", filed Dec. 14, 2013.
Tarkoff, Rob, "Choose Customer Service without the Call Centre", Published on: Mar. 27, 2013, Available at: http://www.theguardian.com/media-network/media-network-blog/2013/mar/27/customer-service-social-experience.
Brown, Charles, "Coefficient of Variation", In Publication of Springer, Sep. 23, 2014, 5 pages.
Keller, et al., "ConfErr: A Tool for Assessing Resilience to Human Configuration Errors", In Proceedings of the Intl. Conference on Dependable Systems and Networks, Jun. 2008, 10 pages.
Whitaker, et al., "Configuration Debugging as Search: Finding the Needle in the Haystack", In Proceedings of the 6th Conference on Symposium on Opearting Systems Design & Implementation, Dec. 6, 2004, 14 pages.
Dai, et al., "Configuration Fuzzing for Software Vulnerability Detection", In Proceedings of 10 International Conference on Availability, Reliability, and Security, Feb. 15, 2010, 6 pages.
Yuan, et al., "Context-Based Online Configuration-Error Detection", In Proceedings of the 2011 USENIX Conference on USENIX Annual Technical Conference, Jun. 15, 2011, 14 pages.
Chen, et al., "Declarative Configuration Management for Complex and Dynamic Networks", In Proceedings of the 6th Conference of CoNext, Nov. 30, 2010, 12 pages.
"Desk", Retrieved on: Sep. 23, 2014, Available at: http://www.desk.com/.
Feamster, et al., "Detecting BGP Configuration Faults with Static Analysis", In Proceedings of the 2nd Conference on Symposium on Networked Systems Design & Implementation, May 2, 2005, pp. 43-56.
Xu, et al., "Detecting Cloud Provisioning Errors Using an Annotated Process Model", In Proceedings of the 8th Workshop on Middleware for Next Generation Internet Computing Article No. 5, Dec. 9, 2013, 6 Pages.
Xu, et al., "Detecting Large-Scale System Problems by Mining Console Logs", In Proceedings of the ACM SIGOPS 22nd Symposium on Operating Systems Principles, Oct. 11, 2009, pp. 117-131.
Ramachandran, et al., "Determining Configuration Parameter Dependencies via Analysis of Configuration Data from Multi-Tiered Enterprise Applications", In Proceedings of the 6th International Conference on Autonomic Computing, Jun. 15, 2009, pp. 169-178.
"Dezide Advisor Solution Overview", Retrieved on: Sep. 15, 2014 Available at: http://www.ctif.aau.dk/digitalAssets/36/36045_dezide-advisor-solution-overview.pdf.
Xu, et al., "Do not Blame Users for Misconfigurations", In Proceedings of the Twenty-Fourth ACM Symposium on Operating Systems Principles, Nov. 3, 2013, pp. 244-259.
Nate. et al., "Enabling Configuration-Independent Automation by Non-Expert Users", In Proceedings of the 9th USENIX conference on Operating systems design and implementation, Oct. 4, 2010, 14 Pages.
Zhang, et al., "EnCore: Exploiting System Environment and Correlation Information for Misconfiguration Detection", In Proceed-

(56) References Cited

OTHER PUBLICATIONS ings of the 19th International Conference on Architectural Support for Programming Languages and Operating Systems, Mar. 1, 2014, pp. 687-700.
Weinberger, et al., "Feature Hashing for Large Scale Multitask Learning", In Proceedings of the 26th Annual International Conference on Machine Learning, Jun. 14, 2009, pp. 1113-1120.
Xiong, et al., "Generating Range Fixes for Software Configuration", In Proceedings of the 34th International on Conference Software Engineering, Jun. 2, 2012, pp. 58-68.
Chen, et al., "Generic and Automatic Address Configuration for Data Center Networks", In Proceedings of the ACM SIGCOMM Conference, Aug. 30, 2010, pp. 39-50.
Carlos Perez, Juan, "Google Outages Blamed on Sign-in System",Published on: Apr. 19, 2013, Available at: http://goo.gl/PScp6m.
Ferret. et al., "How NLP can improve Question Answering", Retrieved on: Sep. 15, 2014 Available at: http://perso.limsi.fr/bg/pageWebPHP/fichiers/GrauKO02.pdf.
"How to Query the Microsoft Knowledge Base by Using Keywords and Query Words", Retrieved on: Sep. 23, 2014, Available at: http://support.microsoft.com/kb/242450.
Salton, et al., "Introduction to Modern Information Retrieval", In Publication of McGraw-Hill Book Company, Sep. 23, 2014, 16 pages.
Church, et al., "Inverse Document Frequency (IDF): A Measure of Deviations from Poisson", In Proceedings of Natural Language Processing Using Very Large Corpora, Jun. 1999, 10 pages.
Potharaju, et al., "Juggling the Jigsaw: Towards Automated Problem Inference from Network Trouble Tickets", In Proceedings of the 10th USENIX conference on Networked Systems Design and Implementation, Apr. 2, 2013, pp. 127-141.
Cadar, et al., "KLEE: Unassisted and Automatic Generation of High-Coverage Tests for Complex Systems Programs", In Proceedings of the 8th USENIX Conference on Operating systems Design and Implementation, Dec. 8, 2008, 14 pages.
"Microsoft Developer Network", Retrieved on: Sep. 23, 2014, Available at: http://msdn.microsoft.com/.
"Microsoft Support", Retrieved on: Sep. 23, 2014, Available at: http://support.microsoft.com/.
Wilhelm, Alex, "Microsoft: Azure went Down in Western Europe due to Misconfigured Network Device", Published on: Jul. 28, 2012, Available at: http://goo.gl/USVRIC.
Xu, et al., "Mining Console Logs for Large-Scale System Problem Detection", In Proceedings of Workshop on Tackling Computer Problems with Machine Learning Techniques, Dec. 2008, 6 pages.
Lou, et al., "Mining Invariants from Console Logs for System Problem Detection", In Proceedings of USENIX Conference on USENIX Annual Technical Conference, Jun. 23, 2010, 14 pages.
Aggarwal, et al., "NetPrints: Diagnosing Home Network Misconfigurations using Shared Knowledge", In Proceedings of the 6th USENIX Symposium on Networked Systems Design and Implementation, Apr. 22, 2009, 16 pages.
"Oracle Support", Retrieved on: Sep. 23, 2014, Available at: http://support.oracle.com.
"Physika", Published on Sep. 3, 2014, Available at: http://johnmiedema.com/?p=631.
Rabkin, et al., "Precomputing Possible Configuration Error Diagnoses", In 26th IEEE/ACM International Conference on Automated Software Engineering, Nov. 6, 2011, pp. 193-202.
U.S. Appl. No. 14/106,763, Chan, et al., "Query Techniques and Ranking Results for Knowledge-Based Matching", filed Dec. 14, 2013.
Smadja, Frank, "Retrieving Collocations from Text: Xtract", In Journal of Computational Linguistics, vol. 19, Issue 1, Mar. 1993, 36 pages.
"SCOM 2012 R2—System Center Advisor Overview", Published on Jun. 4, 2014, Available at: http://stefanroth.net/2013/06/29/scom-2012-r2-system-center-advisor-overview/.
Kiefer, J., "Sequential Minimax Search for a Maximum", In Proceedings of the American Mathematical Society, vol. 4, Issue 3, Jun. 1953, pp. 502-506.
Porter, M.F., "Snowball: A Language for Stemming Algorithms", Published on: Oct. 2001, Available at: http://snowball.tartarus.org/texts/introduction.html.
"Software Knowledge Base", Retrieved on: Sep. 23, 2014, Available at: http://www-912.ibm.com/s_dir/slkbase.nsf/slkbase.
Langford, et al., "Sparse Online Learning via Truncated Gradient", In Journal of Machine Learning Research, vol. 10, Mar. 2009, pp. 777-801.
"StackOverflow", Retrieved on: Sep. 23, 2014, Available at: http://stackoverflow.com/.
Wang, et al., "STRIDER: A Black-box, State-based Approach to Change and Configuration Management and Support", In Proceedings of Science of Computer Programming, vol. 53, No. 2, Nov. 2004, pp. 143-164.
"Support", Retrieved on: Feb. 10, 2015, Available at: http://support.microsoft.com/search?query=kb.
Crockford, D., "The Application/Json Media Type for JavaScript Object Notation (JSON)", In Network Working Group, Request for Comments: 4627, Jul. 2006, 10 pages.
Duan, et al., "Tuning Database Configuration Parameters with iTuned", In Proceedings of the VLDB Endowment, vol. 2, Aug. 24, 2009, 12 pages.
Yamamoto, et al., "Using Suffix Arrays to Compute Term Frequency and Document Frequency for all Substrings in a Corpus", In Journal Computational Linguistics, vol. 27, Issue 1, Mar. 2001, 30 pages.
"VMware Knowledge Base", Retrieved on: Sep. 23, 2014, Available at: http://kb.vmware.com.
"Windows Error Reporting", Retrieved on: Sep. 23, 2014, Available at: http://msdn.microsoft.com/en-us/library/bb513641(v=vs.85).aspx.
Miller, George A., "WordNet: A Lexical Database for English", In Communications of the ACM, vol. 38, Issue 11, Nov. 1995, pp. 39-41.
Attariyan, et al., "X-ray: Automating Root-Cause Diagnosis of Performance Anomalies in Production Software", In Proceedings of the 10th USENIX conference on Operating Systems Design and Implementation, Oct. 8, 2012, pp. 307-320.
Aolmedo, "Software Engine", Retrieved from <<https://en.wikipedia.org/w/index.php?title=Softwareengine&oldid=640259200>>, Dec. 30, 2014, 2 Pages.
PCT International Search Report and Written Opinion Issued in PCT Application No. PCT/US2016/015494, dated Apr. 28, 2016, 12 Pages.
"Office Action Issued in European Patent Application No. 16703242.4", dated Dec. 21, 2018, 6 Pages.

\* cited by examiner

| Input Token Stream 406 | SQL | SERVER | IS | UPDATED |
|---|---|---|---|---|
| Original Token Sequence 408 | 1 | 2 | 3 | 4 |
| Named-entity Recognition 410 | STEP 1: CHECK: EXISTS AS ENTITY ACTION: INCREMENT TOKEN | STEP 2: CHECK: EXISTS AS NEIGHBOR ACTION: INCREMENT TOKEN | STEP 3: CHECK: NOT A NEIGHBOR ACTION: OUTPUT ENTITY + LAST SEEN TOKEN | |

FINDING DOCUMENTS DESCRIBING SOLUTIONS TO COMPUTING ISSUES

BACKGROUND

In order to provide support to users, many companies provide an information repository (referred to as a knowledge base) that includes a database of technical articles, answers to frequently asked questions (FAQ), and other types of information. Users may search the knowledge base to identify technical articles from the knowledge base that are relevant to a particular problem or issue. The relevant technical articles may include (1) articles that are informational or merely provide recommendations or guidelines as well as (2) articles that provide a solution for the problem or issue. With a large knowledge base, the user may spend a significant amount of time distinguishing those articles that provide a solution from the merely informational articles.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

When a computing device has an issue (e.g., a problem, an error, slow performance, frequent restarts or crashes, error log, or the like), a detector receives (or retrieves) data associated with the computing device. The data may include parameter key-value pairs. The detector creates queries based on the data and distributes the queries to one or more matching engines, such as an exact matching engine, a proximity matching engine, or both. The matching engines look for matches in an index of database documents. The results from the matching engines are aggregated and ranked. A relevancy score of individual documents in the ranked results is determined (e.g., using a classifier or other mechanism). In some cases, users may provide feedback regarding the relevancy of the results, and the feedback may be used to recalibrate how the relevancy scores are determined.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
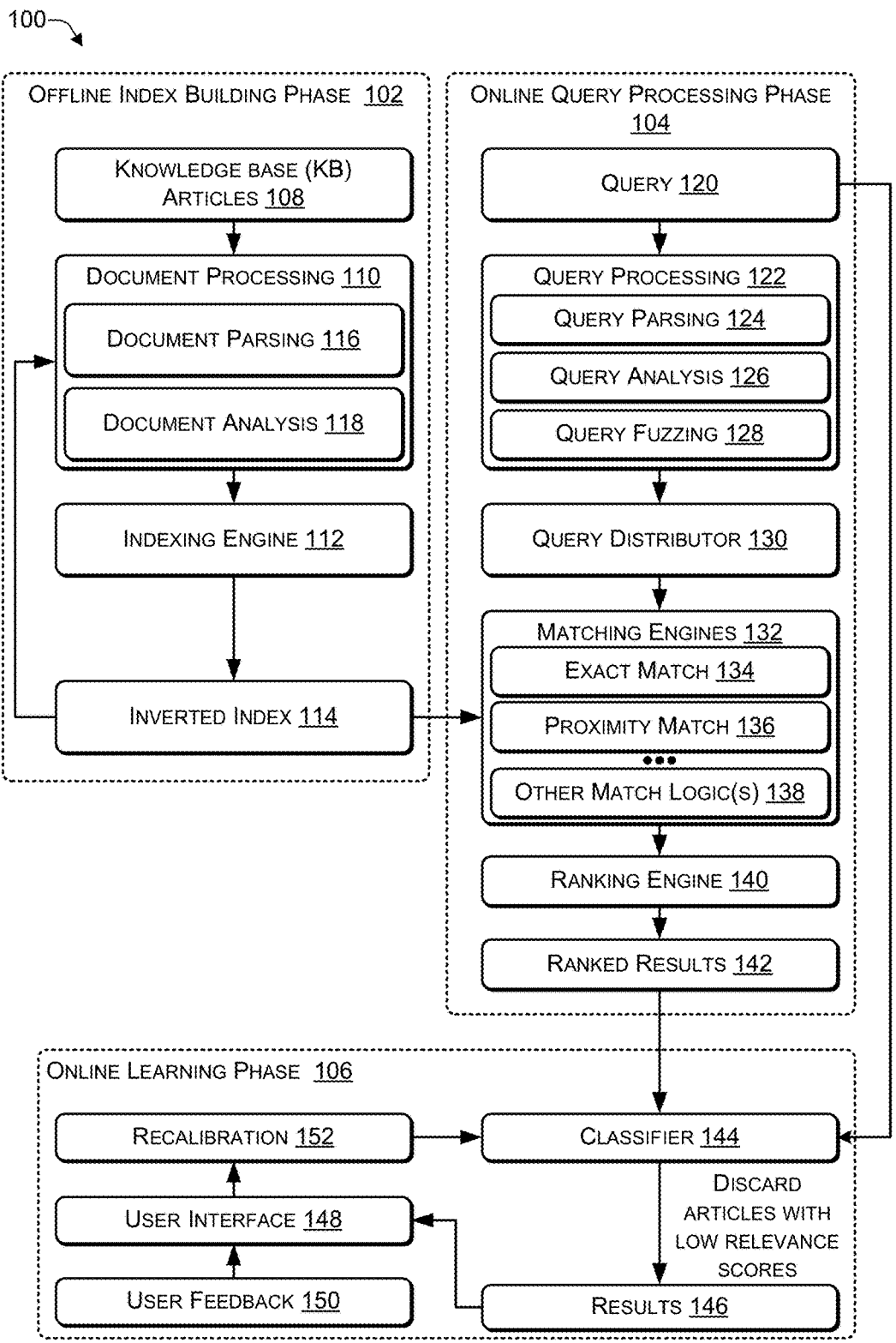
FIG. 1 is an illustrative architecture that includes three phases of a system to detect issues and identify articles with solutions according to some implementations.

Described herein are techniques and systems to detect and identify documents with solutions (e.g., fixes) to software issues (e.g., errors, misconfigurations, issues related to performance, security, reliability, system management, etc.) from a database (e.g., a knowledge base (KB) or other information repository) based on information associated with the software issues. The issues may include problems, errors, performance-related issues, security-related issues, reliability-related issues, system management issues, and the like. While software configuration issues are used as examples of software issues, the techniques and systems that are described herein may be used to detect and identify solutions to other types of issues associated with computing devices, including software issues, hardware issues, etc. A knowledge base (KB) is a database used to store information, such as information associated with products, services, etc. While the examples herein describe retrieving technical articles from a knowledge base, the systems and techniques described herein may be used to retrieve electronic documents, such as posts in an online forum, technical articles in a knowledge base, frequently asked questions (FAQs), articles (e.g., newspaper articles, magazine articles, etc.), other types of electronic documents, or any combination thereof. For example, a company that sells products may provide a knowledge base that includes specification sheets, operating manuals, repair manuals, known issues, and other information associated with the products. In addition, when a user of a product posts a question or creates a trouble report regarding the product, an expert (e.g., someone with detailed knowledge about the product) may respond to the question or trouble report. If currently not in the knowledge base, the question or trouble report and the expert's response may be added to the knowledge base to enable other users with similar issues to find the response in the knowledge base. For example, if a user creates a trouble report detailing a problem, the expert may respond by indicating that a fix (or a workaround) to the problem is available. An administrator of the knowledge base may determine which information (e.g., from the user's description of the problem and the expert's response) to add to the knowledge base. The administrator may modify the information before adding it to the knowledge base by editing the information, adding links to related entries in the knowledge base, etc. If a second user encounters the same (or similar) problem, the second user may search the knowledge base to find the expert's response and then apply the information in the response to solve the problem. Thus, the information stored in a knowledge base may be trusted because the information includes descriptions of problems and responses, provided by experts, related to the problems.

Configuration issues may have a significant impact on the performance and availability/downtime of a computing device. For instance, a misconfiguration in a user-authentication system may cause login problems. Configuration issues may have a variety of causes, including faulty patches, failed uninstallations (e.g., dangling file references), manual fixes attempted by users, etc. For several reasons, troubleshooting misconfigurations may be hard, time-consuming, and/or expensive. First, today's software configurations may be complex and large, e.g., comprising hundreds of parameters and settings. Given a large installed base of multiple applications with numerous third party packages, specifying a common or ideal configuration state or asking developers to manually specify the correct values of each parameter may be difficult. Second, configuration issues may manifest as silent failures, leaving users without any clues as to the cause, thereby causing a loss of productivity, data, time, and/or effort.

The KB articles may describe the software configuration problems and their corresponding solutions. By enabling a system to accurately understand the software configuration problems, the system can automatically identify the corresponding solutions. Finding an accurate match may be difficult because (a) the KB articles are written in natural language text and an article may cover a broad set of problems rather than specific issues, and (b) configuration files typically contain a large number of parameters and settings. To find an accurate match, the techniques and systems described herein use a novel combination of three key ideas: (a) semantic matching (b) separating a matching mechanism from a policy-based ranking, and (c) online learning to improve result ranking. The separation of mechanism and policy is a software design principle stating that mechanisms (e.g., the portions of a system implementation that control authorization of operations and allocation of resources) should be separate from and not influence policies regarding which operations to authorize, and which resources to allocate.

Free-form text in KB articles is normalized, a feature vector is built, and an inverted index is constructed to enable identifying solutions. A snapshot of a computing device, comprising a set of <parameter key, value> pairs, is parsed and transformed into a series of queries. The queries are distributed to one or more feature matchers (e.g., exact match, proximate match, and the like) that may be executed in parallel. The accuracy scores of matching KB articles may be input to a ranking engine that aggregates corresponding final scores based on specified policies (e.g., article popularity, expert guidelines, customer feedback, or the like). In addition, machine learning may be used to train a classification model that is used to filter relevant results.

Illustrative Architectures

FIG. 1 is an illustrative architecture 100 that includes three phases of a system to detect issues and identify articles with solutions according to some implementations.

The system in FIG. 1 automatically (e.g., without human interaction) finds configuration issues (e.g., misconfigurations) on computing devices using a database of documents, such as a knowledge base (KB) of technical articles. The technical articles in the knowledge base may include (1) articles that are informational or that provide recommendations (e.g., guidelines) and (2) articles that provide a solution (e.g., a fix) for a particular problem or a particular type of problem. The technical articles may include articles written to provide self-support to customers of a software/hardware product. For ease of understanding, and purely for illustration purposes, the system in FIG. 1 is described as addressing configuration parameter-related misconfigurations. However, it should be understood that the systems and techniques described herein may be applied to identifying solutions to other types of problems, including software problems, firmware problems, hardware problems, etc.

The system in FIG. 1 provides configuration-diagnosis as a service (e.g., cloud-based service) by automatically determining configuration problems and identifying corresponding solutions that are described in KB articles. In some cases, the solution(s) identified in the KB articles may be provided to administrators or users, while in other cases, the solutions identified in the KB articles may be automatically implemented.

Overview

A snapshot of a state of computing device may be captured and used to identify solutions. The snapshot may include data associated with the computing device, such as parameters associated with the computing device and their corresponding values. For example, if a computing device is set to automatically login a user (e.g., without prompting the user to enter a user name and password), the snapshot may include AutoLogin=true, indicating that the Boolean parameter key "AutoLogin" is set to the value "true." In some cases, a snapshot may include error logs, a memory dump (e.g., contents of memory when a problem occurred), registry files, or other information associated with the computing device. A snapshot that captures the content of at least some configuration files on a computing device is taken. Configuration parameter key and value settings (e.g., <parameter key, value> pairs) are extracted from each of the snapshots and compared to KB articles to identify matching articles. For example, the pair <EnableDHCP, 1> indicates that a parameter key called EnableDHCP, indicating a status of dynamic host control protocol (DHCP), is set to true (e.g., DHCP is enabled). After a match is found, the configuration issue is identified and the matching KB article is provided to enable a user to apply the solution described in the matching KB article. The techniques used to identify matching KB articles include (1) semantic matching, (2) separating the matching mechanism from policy based ranking, and (3) online learning to improve accuracy and ranking of results. Because KB articles are written in natural (e.g., free-form text), the KB articles are processed and converted to a canonical (e.g., standardized or normalized) representation, a feature vector is built for performing matching, and an inverted index is constructed to perform fast lookups of feature values across KB articles.

Using the <parameter key, value> pairs from the configuration snapshots, the system performs feature matching in parallel (e.g., substantially contemporaneously) based on (a) exact keywords, (b) proximity of the keywords to each other, (c) synonyms and abbreviations of the parameter keys, and (d) constraints on parameter settings (e.g., data type, format, value range, and the like). The system uses two specific techniques, in combination with others: (1) synonym expansion combined with named-entity resolution and (2) constraint evaluation on text using Abstract-Syntax-Trees. In addition, the mechanism is separated from policy by aggregating the accuracy scores of KB articles matched based on individual <parameter key, value> pairs and then computing a final ranking for the entire configuration snapshot based on specified policies. This separation of mechanism from policy enables applications to use any desired technique to rank the matching articles e.g., using popularity scores, expert guidelines or customer feedback. To improve the accuracy of the results (e.g., matching KB articles), a classifier may be trained using labeled KB articles. The trained classifier may then be used to filter relevant results.

The system of FIG. 1 addresses three key trade-offs that are involved when mapping problems to solutions: (i) accuracy versus relevance, (ii) completeness versus ranking, and (iii) automation versus human-driven analysis. First, search engines typically optimize for query relevance to retrieve documents having relevant text or links, while retrieving as few non-relevant documents as possible. The system of FIG. 1 is designed to perform accurate mapping of configuration issues to corresponding KB solutions using semantic matching and to evaluate constraints on configuration parameter values. Second, rather than focusing on solving a single misconfiguration, the system of FIG. 1 identifies multiple misconfigurations and the corresponding solutions in the KB articles. In contrast, search engines typically focus on assigning the highest rank to a most relevant article. Third, the system is designed to parse the natural language text in KB articles to identify accurate solutions to configuration problems.

The architecture 100 includes three phases: an offline index building phase 102, an online query processing phase 104, and an online learning phase 106. In the offline index building phase 102, knowledge base (KB) articles 108 are processed by document processing 110 that includes document parsing 116 and document analysis 118. The document parsing 116 builds an intermediate canonical (e.g., normalized or standardized) representation of each knowledge base article which is parsed to identify keywords and key phrases. The document analysis 118 uses a pipeline of filters to extract feature vectors for indexing and querying. After the knowledge base articles 108 are processed by the document processing 110, an indexing engine 112 is used to create an inverted index 114 to enable fast matching. The inverted index 114 is merely used as an example, and in some implementations, another type of index may be created and used to achieve similar results.

The offline index building phase 102 includes building an index (e.g., an inverted index 114) that responds to several different types of queries (e.g., free-form queries, fuzzy matching queries, and the like). To build the index, the type of features that are to be extracted from the raw KB articles 108 and searched are identified. The features are extracted in a manner that is scalable so that a database with a large number of documents can be indexed quickly and efficiently. In addition, techniques are used to evaluate constraints on configuration parameter key-value pairs in free-form text.

Document processing 110 pre-processes the KB articles 108 to enable the processed articles to be indexed. The document processing 110 may include parsing the KB articles 108 using document parsing 116. The document parsing 116 may include parsers for a variety of document formats, including eXtensible Markup Language (XML), HyperText Markup Language (HTML), Comma Separated Values (CSV), plain text, or other types of document formats. Each input document from the KB articles 108 may be parsed into an intermediate representation that may be stored, processed further, or both. However, stripping metadata tags from a document may result in the loss of the semantic context of the neighboring text. For example, flattening an HTML table inside a KB article will result in the loss of the association between the header column information and each of the row values. To address this challenge, the document parsing 116 flattens an input document (e.g., one of the KB articles 108) as follows. Regular text, e.g., text inside paragraph tags (e.g., <p>, <span>) is converted to plain-text "as is," without any modification. To preserve the semantic information in tables, the document parsing 116 replicates information included in the header of each row by transforming the hierarchical document structure into a corresponding lightweight data-interchange format, such as, for example, a JavaScript® Object Notation (JSON) format. For example, the following HTML table:

| EventID | Description |
|---------|-------------|
| 1066 | This event . . . |
| 223 | This error describes . . . |
| . . . | . . . |
| 437 | When the user . . . | may be parsed and represented using JSON as follows:

```
[{
    "EventID":1066,
    "Description": "This event ..."
},
{   "EventID":223,
    "Description": "This error describes ..."
},
{   "EventID":1066,
    "Description": "When the user ..."
}]
```

Document analysis 118 may include extracting content from the parsed KB articles 108 for indexing. To build an index (e.g., the inverted index 114), the natural language text inside the KB articles 108 may be converted into a fine-grained representation, referred to as terms, and the terms may be indexed. To determine which terms are selected for indexing, the document analysis 118 takes into account: (1) whether the terms provide contextual information, (2) whether the terms are technical terms (e.g., terms of art), (3) constraint evaluation (described in detail below), and (4) synonyms of terms in the KB articles 108.

For each of the KB articles 108, the text in each sentence is processed by identifying relevant adjectives using a part-of-speech (PoS) tagging module to describe the relationship of each KB articles towards solving a problem. The relevance of adjectives in each KB articles may be categorized as a binary feature, e.g., either relevant or non-relevant. For example, the binary "0" indicates that a KB article is a "miss" because the text likely does not provide a solution due to the use of terms such as "recommended," "suggested," "how to," etc. The binary "1" indicates that a KB article is a "hit" because the text likely provides a solution due to the use of terms such as "critical," "necessary," "performance degradation," etc. When tagging the text in the KB articles, a named-entity may be used to mark the subject.

PoS tagging of an example expression may be as follows: in/IN the/DT management/NN partition/NN does/VBZ not/RB need/VB more/JJR than/IN 64/CD VPs/NNS to/TO perform/VB adequately/RB (see Table 1 for more information). By performing named-entity detection, a determination is made that VPs (virtual processors) is the subject in the sentence and so [NE] is appended after the named-entity: in/IN the/DT management/NN partition/NN does/VBZ not/RB need/VB more/JJR than/IN 64/CD [VPs/NNS][NE] to/TO perform/VB adequately/RB.

After tagging all extracted sentences from the KB articles, there are several other pieces of information that can determine the relevance of a KB article. For example, a KB article that indicates setting one or more parameter values may imply that the KB article is written to fix a particular problem. For example, setting EnableDHCP to 1 (to indicate true) enables dynamic host control protocol (DHCP), enabling a server to automatically assign an internet Protocol (IP) address to the computer. First, the appearance of specific key words may indicate that a KB article includes information to solve a problem. The specific key words may include: (a) comparative adjectives or verbs, such as more, larger, bigger, less, fewer, earlier, and the like, (b) superlative adjectives or verbs, such as most, least, up to, limit, upper bound, lower bound, and the like, (c) verbs that mean 'equal to', such as equals, set to, and the like, (d) an indication of a number, such as integer, float, version, Boolean, and the like, and (e) negation, such as not, no, and the like. Second, in addition to the appearance of key words, an order of the key words and a distance between the key words may be determined Third, the appearance of certain special words in particular context, such as the appearance of "than" after a comparative adjective, the appearance of "to" after equal, the appearance of "or/and" between a number and a comparative adjective, etc. The appearance of the aforementioned words and structures indicates a high likelihood that a sentence includes a value type expression. A distance function Dist(A, B) between two words A and B can be defined as:

$$Dist(A, B) = \begin{cases} B's\ position - A's\ position, & \text{if } A \text{ and } B \text{ exist in the sentence} \\ MaxDist, & \text{if either } A \text{ or } B \text{ does not exist} \\ & \text{in the sentence or } B's\ position - \\ & A's\ position > MaxDist \\ -MaxDist, & \text{if } B's\ position - A's\ position < \\ & (-MaxDist) \end{cases}$$

where A and B are two words in a sentence, and MaxDistance is set to a particular threshold (for instance, 20).

Based on the above three pieces of information, the following features are defined:

TABLE 1

FEATURE DEFINITIONS

| Feature Name | Description | Feature Type |
|---|---|---|
| VB1 | Appearance of specific verbs that mean 'recommend,' 'suggest,' 'degrade,' 'suffer,' 'fail,' 'crash,' etc. 1 if one exists, 0 if not | float |
| RB1 | Appearance of specific adverbs meaning 'how' etc. 1 if one exists, 0 if not | float |
| JJ1 | Appearance of specific adjectives that mean 'necessary,' 'critical,' 'important,' etc. 1 if one exists, 0 if not | float |
| JJR1 | Appearance of comparative adjectives or verbs that mean "more than" 1 if one exists, 0 if not | float |
| JJR2 | Appearance of comparative adjectives or verbs that mean "less than" 1 if one exists, 0 if not | float |
| JJS1 | A superlative adjective or verb that means "more than" 1 if one exists, 0 if not. | float |
| JJS2 | A superlative adjective or verb that means "less than" 1 if one exists, 0 if not. | float |
| Equal | Appearance of words that mean "equal" (e.g., set) 1 if one exists, 0 if not. | float |
| CD | Appearance of a value type, such as integer, float, version, boolean, etc. 1 if one exists, 0 if not. | float |
| Unit | A unit of measure, such as bit, byte, second, hour, day, etc. This is a text feature, so each unique value is a new feature. | text |
| Neg | Appearance of a form of negation. 1 if one exists, 0 if not. | float |
| Dist(Neg,JJR1) | Distance between Neg and JJR1 | float |
| Dist(Neg,JJR2) | Distance between Neg and JJR2 | float |
| Dist(Neg,JJS1) | Distance between Neg and JJS1 | float |
| Dist(Neg,JJS2) | Distance between Neg and JJS2 | float |
| Dist(Neg,Equal) | Distance between Neg and Equal | float |
| Dist(Ne,JJR1) | Distance between named entity (NE) and JJR1 | float |
| Dist(Ne,JJR2) | Distance between NE and JJR2 | float |
| Dist(Ne,JJS1) | Distance between NE and JJS1 | float |
| Dist(Ne,JJS2) | Distance between NE and JJS2 | float |
| Dist(Ne,Equal) | Distance between NE and Equal | float |
| Dist(JJR1,Cd) | Distance between JJR1 and CD | float |
| Dist(JJR2,Cd) | Distance between JJR2 and CD | float |
| Dist(JJS1,Cd) | Distance between JJS1 and CD | float |
| Dist(JJS2,Cd) | Distance between JJS2 and CD | float |
| Dist(Equal,Cd) | Distance between Equal and CD | float |
| Dist(Ne,Cd) | Distance between NE and CD | float |
| Text | Text extracted from the KB articles, FAQs, etc. | text |

TABLE 2

PARTS-OF-SPEECH ABBREVIATIONS

| Abbreviation | Part of Speech |
| --- | --- |
| # | Pound sign |
| $ | Dollar sign |
| " | Close double quote |
| " | Open double quote |
| ' | Close single quote |
| ' | Open single quote |
| , | Comma |
| . | Final punctuation |
| : | Colon, semi colon |
| LRB | Left bracket |
| RRB | Right bracket |
| CC | Coordinating conjunction |
| CD | Cardinal number |
| DT | Determiner |
| EX | Existential there |
| FW | Foreign word |
| IN | Preposition |
| JJ | Adjective |
| JJR | Comparative adjective |
| JJS | Superlative adjective |
| LS | List Item Marker |
| MD | Modal |
| NN | Singular noun |
| NNS | Plural noun |
| NNP | Proper singular noun |
| NNPS | Proper plural noun |
| PDT | Predeterminer |
| POS | Possesive ending |
| PRP | Personal pronoun |
| PP$ | Possesive pronoun |
| RB | Adverb |
| RBR | Comparative adverb |
| RBS | Superlative Adverb |
| RP | Particle |
| SYM | Symbol |
| TO | to |
| UH | Interjection |
| VB | Verb, base form |
| VBD | Verb, past tense |
| VBG | Verb, gerund/present participle |
| VBN | Verb, past participle |
| VBP | Verb, non 3rd ps. sing. present |
| VBZ | Verb, 3rd ps. sing. present |
| WDT | Wh determiner |
| WP | Wh pronoun |
| WP$ | Possesive wh pronoun |
| WRB | Wh adverb |

The KB articles 108 may include contextual words that provide meaning to a technical term or parameter key. For example, in addition to words that capture information related to the parameter keys and values in configuration snapshots, e.g., domain-specific information, the KB articles 108 may include contextual information associated with the words (e.g., a context surrounding each word) that may facilitate accurate matching. For example, in the sentence "set the TcpTimedWaitDelay setting to 30", the parameter key "TcpTimedWaitDelay" may be indexed along with the context "30" to enable accurate matching and retrieval of relevant articles from the KB articles 108. To address identifying contextual words, a vector-space model may be used to represent each the of the KB articles 108 as a bag-of-words which are store in the inverted index 114. In some implementations, the inverted file structure of the inverted index 114 may include not only individual terms and documents in which they appear, but also a position offset to enable proximity-search queries (e.g., term x near term y). For example, the position offset may identify how many positions a first term is from a second term in a particular KB article.

The KB articles 108 may include technical terms. In some cases, the technical terms may use a particular type of spelling, such as CamelCase words, in which compound words or phrases are written such that each word or abbreviation begins with a capital letter. The technical terms GetMethod and SecurityLogOverwrite are examples of CamelCase words. Using keyword matching alone, a query to find "security log" is unlikely to yield a match with SecurityLogOverwrite. However, by taking into account the fact that many technical terms are expressed using abbreviations and or compounded words when performing the document analysis 118, a query to find "security log" will be able to match SecurityLogOverwrite.

A query to identify solutions to a configuration issue may cause an evaluation of a constraint. For example, a query "NumOfLogicalProcessors=6" may retrieve matching text such as "the number of logical processors should be less than or equal to 8" which logically applies to the query. In such cases, numerical values may be enumerated, e.g., "less than or equal to 8" may be replaced with the set [1,8] such that a search for "6" retrieves the text "less than or equal to 8."

Searching for a term as well as synonyms of the term may yield significantly more matches as compared to searching for just the term. Thus, a search for a term in a query may be expanded to include synonyms for the term. For example, a query for "SQL" may be expanded to include queries for synonymous terms, such as "SQL server," "SQL server database," "SQL engine" and the like. Expanding a query term to include synonyms may be performed at runtime, e.g., when the query is received ("Query-time Synonym Expansion"), or offline, during indexing ("Index-time Synonym Expansion"). Determining whether to perform synonym expansion at query-time (e.g., runtime) or at index-time (e.g., offline) involves a typical space-time trade-off. For example, synonym expansion at query-time may consume less space for the index but may increase query latency because multiple queries (one query per synonym) are performed after the query is received. In contrast, synonym expansion at index-time may consumer more space in order to index the synonyms of multiple terms but may reduce query latency.

In addition, the system in FIG. 1 performs intelligent synonym expansion. For example, a naive synonym expansion of the token "SQL" in the sentence "Install SQL Server" may yield "Install [SQL, SQL Server] Server." To address this problem and perform intelligent synonym expansion, a determination is first made that "SQL Server" is a named-entity to enable the synonym expansion to be performed on the correct candidate phrase, e.g., the synonym expansion is performed on "SQL Server" rather than "SQL."

To address identifying whether a term is a technical term, constraint evaluation, and synonyms of terms in the KB articles 108, multiple filters may be used during the offline index building phase 102 and during the online query processing phase 104.

In the online query processing phase 104, the inverted index 114 is used to automatically retrieve a portion of the KB articles 108 that include solutions to configuration issues for a particular configuration snapshot. For example, a configuration snapshot associated with a computing device may be received (or retrieved). The configuration snapshot may include one or more parameter key-value pairs, e.g., configuration parameters associated with the computing device and the corresponding values of the configuration parameters. The configuration parameter keys and the value settings from the snapshot may be queried against the inverted index 114 of the KB articles 108 using semantic matching. To identify matches in the inverted index 114, the configuration parameter keys and the value settings may be converted into queries and each query processed. For example, a query 120 (e.g., derived from the configuration parameter keys and the value settings in the configuration snapshot) may be converted into a normalized form and distributed to one or more matching engines 132. The matching engines may execute multiple searches, substantially at the same time (e.g., in parallel), to retrieve a portion of the KB articles 108, with each retrieved KB article having a corresponding score. Results from each of the matching engines may be aggregated to create a final set of results.

Each query 120 may be processed using query processing 122. The query processing 122 may include query parsing 124, query analysis 126, and query fuzzing 128. After the query 120 is processed using the query processing 122, multiples queries may be created and distributed using query distribution 124. Each of the multiple queries may be distributed to one of multiple matching engines 126 to determine if the inverted index 114 includes a match.

Figure 3:
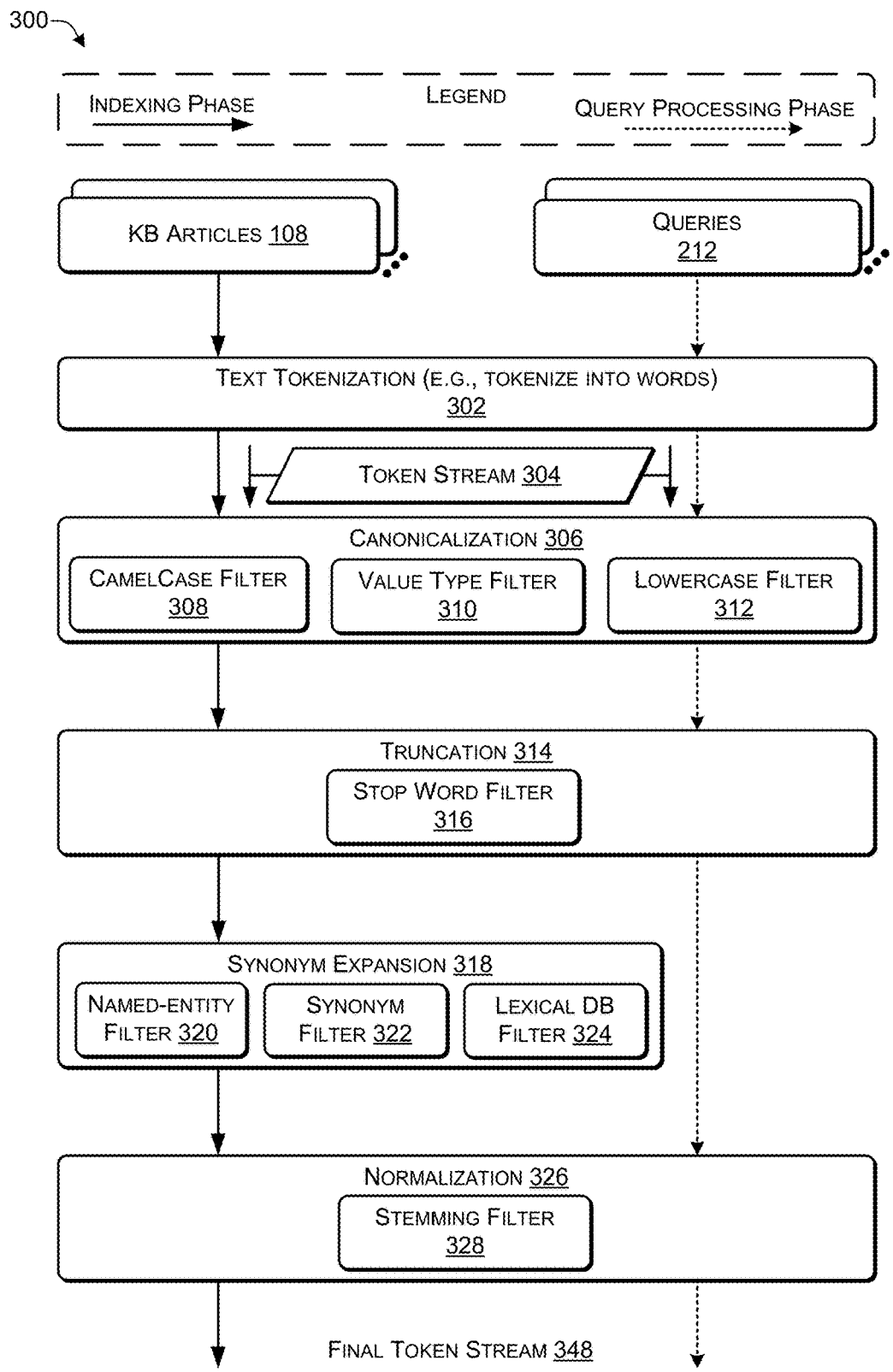
FIG. 3 is an illustrative system that includes a pipeline of processing filters according to some implementations.

Matching the input query 120 of a configuration snapshot against the inverted index 114 may include one or more of (1) processing homogeneity, (2) fuzzing, and (3) matching logic. Processing homogeneity involves retrieving matching articles from the KB articles 108 by processing the query 120 in a manner similar to the way in which the KB articles 108 were processed during the offline index building phase 102. For example, during the offline index building phase 102, a document from the KB articles 108 may be converted to lower case to enable case-insensitive matching. Similarly, each query (e.g., the query 120) may be processed using the query analysis (module) 126. The query analysis module 126 may prepare an abstract representation of the query 120 by rewriting any value-types (e.g., numbers like 7 or seven, Boolean words like true or false, an enumerated set, such as {1, 2, 4}) with generic terms (e.g., NUMERIC, BOOLEAN, ENUMERATED) and store the value separately for constraint evaluation by the matching engines 126. During the online query processing phase 104, the query analysis module 126 may perform processing similar to the processing performed on the input corpus (e.g., the KB articles 108) during the offline index building phase 102. FIG. 3 illustrates the various filters that the query processing 122 may use to process the query 120.

The query fuzzing (module) 128 may construct additional queries based on the original query 120. For some queries, using exact keywords may not return any results. For example, a search of an input query "LSA Crash On Audit Fail Flag" may only return documents including all the terms from the input query but may not return documents where, for example, the word "audit flag" is missing. Therefore, creating additional queries with approximate terms (e.g., "approximate queries") from the original query 120 may yield more matching KB articles. Approximate string matching (referred to as fuzzy string searching) is the technique of finding strings that match a pattern approximately (rather than exactly). Approximate string matching may be approached by finding approximate substring matches inside a given string and finding dictionary strings that approximately (but not exactly) match the pattern. Given the query 120 as input, the query fuzzing module 128 may construct a power set of terms in the query 120 to create approximate searches that match documents containing a subset of terms from the query 120.

For a query such as "ErrorID 823," an exact search or even an approximate search may not return documents that include the text "the Error Id was logged to be 823" due to the presence of additional words between the terms. In such cases, the query fuzzing module 128 may create multiple queries (e.g., relaxed queries) that allow for other terms to appear in between the input query terms. A query distributor 130 may take the multiple queries created by the query fuzzing 128 and invoke, substantially in parallel, multiple matching engines 132. Each of the matching engines 132 may perform a different type of matching. For example, the matching engines 132 may include an exact match engine 134, a proximity match engine 136, and other types of match logic 138.) The matching documents from the KB articles 108 are identified by the matching engines 132, aggregated and ranked by the ranking engine 140, and the ranked results 142 provided (e.g., output).

To perform automatic retrieval of articles from the KB articles 108, a relationship between individual configuration parameters inside a configuration snapshot and the KB articles 108 is identified. For example, given a parameter key-value pair with a constraint, the system 100 of FIG. 1 retrieves a portion of the KB articles 108 that satisfy a truth condition. To illustrate, given a query "NumOfLogicalProcessors=7," the system 100 retrieves KB articles in which the number of logical processors is set to 7. Because the KB articles 108 may be written in natural text, the system 100 may map NumOfLogicalProcessors to natural text, such as "set the logical processors to 7." In addition, the value being searched for may not be included in any KB articles, e.g., a KB articles that includes "the number of logical processors is less than 8" does not include 7 but still satisfies the constraint. The system 100 may use at least two types of matchers: (1) the exact match (engine) 134 and (2) the proximity match (engine) 136. The exact match engine 134 may use a basic search mechanism that looks for documents that contain the key-value pairs in their exact form. The proximity match engine 136 may use proximity-based, approximate matching, along with constraint evaluation to find two terms within a given proximity of one another that satisfy a constraint, when a constraint is included in the query 120. During the query analysis 126, a current token (e.g., term) may include a position relative to a previous token, which enables proximity matching to be performed using the inverted index 114.

The proximity match 136 may include at least two phases, e.g., a retrieval phase and a constraint evaluation phase. For the input query 120, the proximity match 136 may, in addition to retrieving relevant documents (e.g., a portion of the articles from the KB articles 108), track positions of term occurrences that match the query 120. For example, the positions of term occurrences may be tracked (e.g., stored) in the inverted index 114. In addition, the proximity match 136 may perform pruning to remove matches which are beyond a specified distance. For example, when the proximity match 136 is provided a constraint "logical, processors, distance=1," documents that include the terms "logical" and "processors" next to each other may be retrieved. Subsequently, during the online query processing phase 104, words between the matched positional offsets may be obtained using the inverted index 114. Note that setting the value of distance too high may yield a false positive (e.g., 'logical' and 'processor' may appear in different sentences), while setting it too low may result in false negatives (e.g., using distance=1 for the sentence "the processor is a logical one" may not output "logical processor"). Using collocation analysis, setting the distance to a value within the range between (and including) 10 and 20 offers a good trade-off. For example, in some implementations, the distance may be set at 15. In some other implementations, the punctuation symbols denoting sentence boundaries e.g., ".", "?" may also be used to determine the distance.

In some cases, the constraint evaluation phase may be performed after the relevant documents are retrieved, along with the set of words between the matched positions of the input query terms. To perform a truth condition evaluation, each match may be passed through a token extraction process, described in more detail in FIG. 5. In some cases, the truth condition evaluation may be performed on-the-fly (e.g. substantially in real-time). Based on linguistic analysis, the token extraction process may use (a) frequently-used comparative expressions in natural text (e.g., 'less than or equal to,' 'set to,' greater than,' or the like) and (b) a type system to infer values (e.g., numerical, Boolean, floating point, version numbers, enumerated sets, etc.). Using this information, comparative expressions along with any surrounding values may be extracted. An Abstract Syntax Tree (AST) may be constructed to enable individual expressions to be evaluated. The query analysis 126 may abstract values found in the input query 120 (e.g., using a value-type filter) and substitute the values with a generic type. The AST may be constructed with an operator as the root node and operands (e.g., the values extracted from the query and the retrieved document) as the leaf nodes. The ASTs may be compiled in-memory and evaluated on-the-fly (e.g., substantially in real-time) to obtain the truth condition. Matches satisfying the truth condition may be returned for subsequent ranking by the ranking engine 140.

For example, when the query 120 comprises "NumOfLogicalProcessors 8," the query analysis 126 may filter the query 120 to obtain "num logical processor 8." The value-type "8" in the query 120 may be extracted into a separate field and substituted with a generic term, e.g., "NUMERIC." A proximity search may be performed using the canonicalized query "num logical processor NUMERIC" and the relevant document identifiers retrieved. For each match, positional information, along with the text between the positional offsets, may be obtained from the inverted index 114. The natural text may be parsed and corresponding token representations may be created (e.g., "less than" may be represented by "<," "eight" may be represented by "8," "greater than" may be represented by ">," and the like). An AST may be constructed with the leaves representing the values that are to be compared. The root node of the AST may represent the type of operation (e.g., <, >, =, <, >, etc.) that is to be executed on the leaves. The AST may be compiled (e.g., using a compiler) to determine if the condition is satisfied. The matching documents may be provided for ranking by the ranking engine 140. The process of creating and evaluating an AST is described in more detail in FIG. 5.

The ranking engine 140 may score and rank candidate (e.g., matching) articles from the KB articles 108. Because multiple matching engines 132 (see also FIG. 6) may be used, the ranking may occur in multiple stages. For results from the exact match 134, a modified Term Frequency-Inverse Document Frequency (TF-IDF) metric may be used to score the retrieved results. In some cases, TF-IDF may also be used to score results from performing fuzzy (e.g., approximate) matching. In TF-IDF, each of the terms in a particular document is associated with the number of times it occurs in the particular document. Terms are then weighted according to how common they are across the corpus (e.g., the KB articles 108). The principle behind TF-IDF is that rarely occurring terms are more closely related to the meaning of a document than more frequently occurring terms. A score S(q,d) may be calculated for a document d and a query q as follows:

$$S_{exact}(q, d) = c(q, d) \cdot F(q) \cdot \sum_{t \in q} (tf(d) \cdot idf(t)^2) \quad (1)$$

where c(q,d) is the normalized ratio of the number of query terms from q found in the document d and the total number of terms in the query q. Thus, the presence of all the query terms in a particular document will increase the ratio and the absence of one or more of the query terms in the particular document will decrease the ratio.

Query fuzzing module 128 may "fuzz" at least some queries (e.g., the query 120). Hits from "fuzzed" queries receive a lower score compared to those from the original query. Therefore, a fuzz factor F(q) is defined to take "fuzz" into consideration. F(q) is defined as an inverse of a distance between a fuzzed query q and an original query Q, where distance is defined as a number of terms that need to be added to q to get Q. Note that for q=Q, F(q)=∞ (e.g., infinity) giving us an invalid score. To handle this case and prevent a zero from being in the denominator, a Laplace correction is applied by adding 1 to the denominator which yields: F(q)=1 when q=Q.

In equation (1), tf(d) is the frequency of the term t in document d. Therefore, documents having more occurrences of a given term receive a higher score. In equation (1), idf(t) is the inverse document frequency, which measures whether a term is common or rare across all documents, and is determined by taking the ratio of the total number of documents D and the number of documents containing the term t as follows:

$$idf(t) = 1 + \log\left(\frac{|D|}{|d \in D : t \in d|}\right) \quad (2)$$

To score a result of a proximity match, the allowable positional distance between terms is taken into consideration. A score of a proximity match is inversely proportional to the positional distance between terms, e.g., a larger a distance between matched terms, a smaller the assigned score. The score for a proximity match may be calculated using the following equation:

$$S_{prox}(q, d) = c(q, d) \cdot F(q) \cdot \frac{1}{\sqrt{\sum_{t \in q} idf(t)^2}} \sum_{t \in q} idf(t) \frac{L_{avg}(d)}{L(d)} \quad (3)$$

In equation (3), as in equation (2), c(q,d) is the normalized ratio of the number of query terms from q found in the document d and the total number of terms in the query q. $L_{avg}$ is the average length of a document and L(d) is the length of document d. F(q) is the previously determined fuzz factor, computed as 1/(D1+D2), where D1 is the distance of the query q from the original query Q, and D2 is the number of positional moves of the terms in the matched document to approximate Q. For example, when q=Q="Crash On Audit," because q=Q, there is no fuzzing, and hence D1=0. However, for the matched text "Audit flag had the crash bit," D2=5 because it takes 4 positional moves to move "crash"

to the location of "Audit" and then 1 positional move to move "Audit" to the next location, resulting in a final fuzz factor of ⅕ (e.g., 0.2).

The ranking engine 140 receives aggregated results from matchers 134, 136, and 138. The system 100 may use various techniques to aggregate the results from each of the matchers 134, 136, and 138. For example, the online query processing phase 104 may perform linear aggregation with weighted ranking:

$$S(q, d) = \sum_{x \in n} w_x \cdot M_x \quad (4)$$

In equation (4), $w_x$ is the weight assigned to the matcher $M_x$ and n is the total number of matchers implemented. Using sensitivity analysis, the settings $w_{exact}=1.0$ and $w_{proximity}=0.25$ may be used. The ranked results 142 include a top-k articles from the KB articles 108, sorted by score for all detected misconfigurations, and filtered based on relevance.

In the online learning phase 106, human guidance may be used to improve the accuracy and ranking of the ranked results 142. A classifier 144 may be trained (e.g., via machine learning) using a training set of KB articles that have already been labeled, e.g., by experts. The classifier 144 is used to classify the ranked results 142 based on relevance before results 146 are provided. An interactive user interface 148 may be provided to receive user feedback 150. The user feedback 150 may be used for recalibration 152 of the classifier 144. For example, the user feedback 150 may be used to recalibrate the classifier 144 to remove (or rank lower) KB articles in the results 146 that the user feedback 150 indicates are not relevant.

Thus, the system 100 may be used to identify configuration issues in a computing device. The system 100 may be implemented using multiple servers and may be accessed as a cloud-based service. In the offline index building phase 102, the KB articles 108 are parsed and analyzed to create an index (e.g., the inverted index 114). In the online query processing phase 104, the query 120 that includes a configuration snapshot of a computing device with configuration issues is received. The query 120 may be sent by a software application or an operating system of the computing device. In the online query processing phase 104, the query 120 may be processed in a manner similar to the way the KB articles 108 were processed in the offline index building phase 102. The terms in the query 120 may be parsed and analyzed. In some cases, the terms in the query 120 may be fuzzed to identify KB articles that have similar terms, but not the exact terms, from the query 120. The terms and the fuzzed terms from the query 120 are distributed to multiple matching engines, including at least an exact matching engine and a proximity matching engine. The results from the matching engines 132 are aggregated and ranked to provide ranked results. In an online learning phase, the classifier 144 may be created using machine learning techniques (e.g., support vector machine, Bayesian, etc.). User feedback may be solicited and incorporated into the classifier 144. In this way, the system 100 may provide the results 146 that include a portion of the KB articles 108 that describe solutions to addressing the configuration issues of the computing device.

Figure 2:
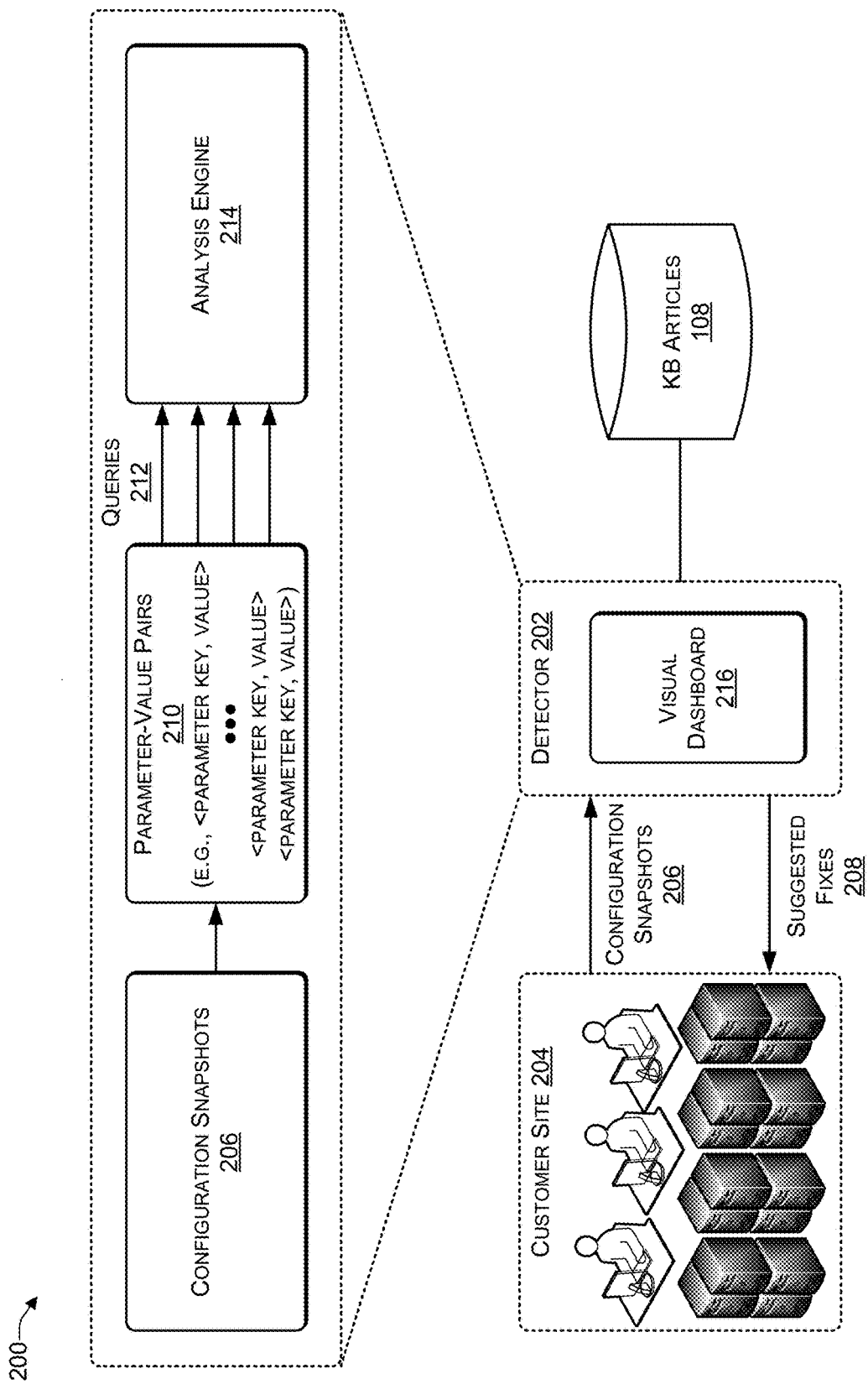
FIG. 2 is an illustrative architecture that includes a customer site and a detector to detect issues and identify articles with solutions according to some implementations.

FIG. 2 is an illustrative architecture 200 that includes a customer site and a detector to detect problems and identify articles with solutions according to some implementations.

For example, a detector 202 may monitor multiple computing devices at a customer site 204. Periodically (e.g., at a predetermined interval) or in response to identifying a configuration issue, the detector 202 may receive configuration snapshots 206. Each of the configuration snapshots 206 may be associated with a particular computing device at the customer site 204. The detector 202 may automatically (e.g., without human interaction) (i) retrieve (e.g., pull) the configuration snapshots 206, (ii) receive (e.g., push) the configuration snapshots 206, or any combination thereof. For example, the detector 202 may periodically retrieve the configuration snapshots 206 from the individual computing devices at the customer site 204. As another example, at a predetermined time interval (e.g., each day), the detector 202 may request that individual computing devices at the customer site 204 send the configuration snapshots 206 to the detector 202. As a further example, each of the individual computing devices at the customer site 204 may automatically send the configuration snapshots 206 to the detector 202. As yet another example, if the detector 202 determines an issue with a particular computing device at the customer site 204, the detector 202 may request that the particular computing device send the configuration snapshots 206. Based on the configuration snapshots 206, the detector 202 may identify suggested fixes from the KB articles 108 and provide the suggested fixes 208 to a person (e.g., a site administrator, an end user, etc.) at the customer site 204.

The detector 202 may extract parameter key-value pairs 210 from the configuration snapshots 206. For example, to detect configuration issues, the parameter key-value pairs 210 may include configuration parameters and their corresponding values associated with the computing devices at the customer site 204. The detector 202 may parse the configuration snapshots 206 into a set of multiple independent key-value type queries 212. Each query is converted into an abstract form (e.g., using the query processing 122 of FIG. 1) and distributed to multiple matchers (e.g., the matching engines 132). Finally, the results from each matcher are sent to a ranking engine (e.g., the ranking engine 140) which aggregates the scores and displays the KB articles with the highest score as the suggested fixes 208. In some implementations, the detector 202 may provide a visual dashboard 216 that displays various types of information. For example, the visual dashboard 216 may identify how many computers at the customer site 204 have currently been identified as having configuration issues, how many suggested fixes 208 have been provided for the configuration issues, how many configuration issues were fixed in a predetermined interval (e.g., in the last 24 hours, last week, last month, etc.), other information related to the customer site 204, or any combination thereof.

FIG. 3 is an illustrative system 300 that includes a pipeline of processing filters according to some implementations. The system 300 illustrates how a pipeline of filters are used to extract tokens from KB articles for indexing and how at least a portion of the filters are used to process a query prior to using the index to find matching articles.

Indexing Phase

Figure 12:
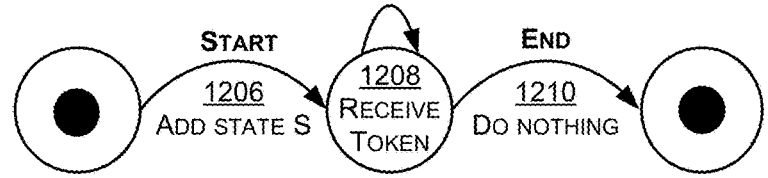
FIG. 12 shows an illustrative process to create and filter a deterministic finite word automaton (DFWA) according to some implementations.
Figure 12:
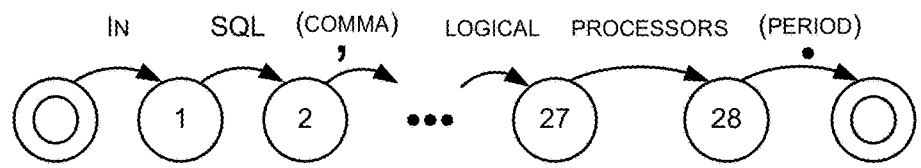
Figure 12:
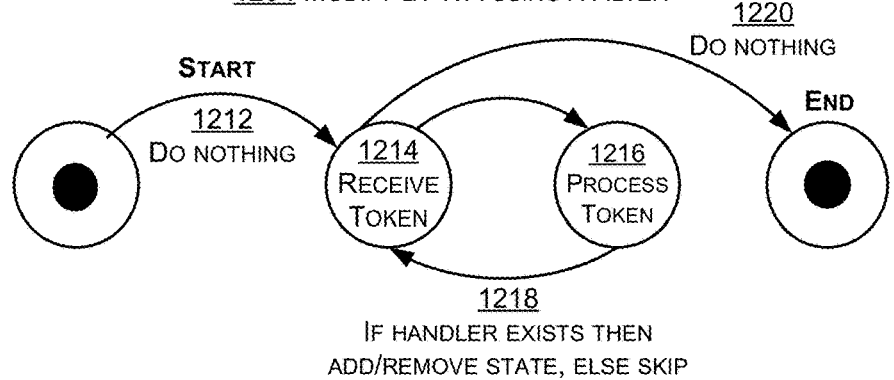
Figure 12:
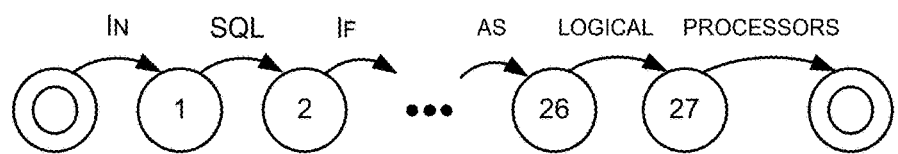

During the parsing of the KB articles 108, each sequence of text is modeled as a deterministic finite word automaton (DFWA), e.g., an automaton used to model the processing of input text. A DFWA includes a finite set of states Q (e.g., token positions) and a transition function d that takes as arguments a state and an input symbol, and returns a state. Given a term sequence DFWA, text tokenization 302 is performed. The text tokenization 302 includes filtering, such as discarding punctuation, removing accents from characters, changing words into a basic form (lemmatizing, e.g., grouping together different inflected forms of a word so they can be analyzed as a single item), and the like. The text tokenization 302 outputs a token stream 304 that is further processed. FIG. 12 describes creating and filtering a DFWA in more detail.

To support queries on technical words and support constraint evaluation on natural text, canonicalization 306 may be performed using multiple filters. The canonicalization 306 may convert tokens in the token stream 304 to a standardized (e.g., normalized) format. A CamelCase filter 308 expands terms written in CamelCase into constituent words to enable free-form searching. There are five types of CamelCase words that commonly occur in technical articles related to computing devices. (1) A standard type of 'CamelCase' may be used for type names and references in source code or configuration entities, e.g., GetMethodName. (2) An interior type of 'camelCase' may be used for identifier names, e.g., methodName. (3) A third type of 'CamelCASE' may use all capital letters for a last term, e.g., GetBIT. (4) A fourth type of 'CAMELCASE' may use all capital letters to identify abbreviations or Boolean bits, e.g., ENABLED. (5) A mixture of CamelCase and capital letters may be used to include abbreviations inside a word, e.g., WeakRSAKeys. When an input includes a CamelCase word, the CamelCase filter 308 outputs the original token along with its constituent words. For example, the term 'SecurityLogOverwrite' is converted into the tokens [SecurityLogOverwrite, Security, Log, Overwrite].

A value type filter 310 performs constraint evaluation on natural text. During an indexing phase (e.g., the offline index building phase 102), an accuracy and speed of the indexing phase may be improved by providing information regarding a value type to the index, e.g., NUMERIC for 8, BOOLEAN for true, with the same token position as the value. Therefore, given a DFWA, the value type filter 310 detects a type of the token (e.g., numerics such as 1,2,3, booleans such as true/false, version numbers such as 1.0.0.1) and outputs a replacement token with the same position as the input token. For example, a KB article may include "In SQL, if the number of logical processors is less than or equal to 8, set the InMemory bit to true . . . ." The information created during indexing may indicate that "8" is a Numeric field and that the "true" is a Boolean field. For example, "In SQL, if the number of logical processors is less than or equal to 8 NUMERIC, set the InMemory bit to true BOOLEAN . . . ." Note that the positional information for both 8/NUMERIC and true/BOOLEAN is same in the index (e.g., the inverted index 114), e.g., 15 and 21, respectively. The value information that is stored in the index when the index is created may be used during the query processing phase to provide faster and more accurate constraint evaluation.

A lowercase filter 312 outputs a lowercase version of an input token from the token stream 304. Note that the lowercase filter 312 is used after applying the CamelCase filter 308 because otherwise the property of CamelCase words would not be preserved and expansion would not be possible. In some implementations, the filters 308, 310, and 312 may be performed serially, with the CamelCase filter 308 being applied first, followed by the value type filter 310, and then the lowercase filter 312.

Prior to performing a synonym search, truncation 314 reduces a number of candidates for synonym expansion by filtering out commonly used words or phrases. The truncation 314 may include a stop word filter 316 that filters out frequently occurring words in the language in which the KB articles 108 are written. For example, for articles written in English, the stop word filter 314 filters out common words, such as 'a,' 'the,' 'and,' 'my,' 'I,' and the like.

In synonym expansion 318, a named-entity filter 320 may be used to identify named-entities before the named-entities are expanded using synonyms. The synonym expansion 318 may use one or more dictionaries. For example, in some implementations, a first dictionary is created based on words from the KB articles 108 and a second dictionary includes a lexical database (e.g., similar to WordNet®) that groups words into sets of synonyms, and records a number of relations among the synonym sets and the members of each synonym set. The second dictionary may be a combination of a dictionary and a thesaurus.

The named-entity filter 320 is used to identify named-entities prior to expanding the named-entity using synonyms. For example, in the sentence "Install SQL Server in your machine," the named-entity filter 320 recognizes that "SQL Server" is a named-entity and therefore a candidate for synonym expansion. When the named-entity filter 320 recognizes that a set of one or more tokens are to be grouped as a named-entity, the named-entity filter 320 modifies the DFWA by adjusting the positional information of tokens in this group to the position of the first token in the named-entity.

The named-entity filter 320 may perform several steps to recognize a named-entity. First, the free-form text may use repeated pattern mining and statistical natural language processing to automatically obtain a list of named entities from the input corpus (e.g., the KB articles 108). For example, the most frequently occurring phrases are identified. Residual Inverse Document Frequency (RIDF) may be used to identify the important phrases from the most frequently occurring phrases. For example, phrases with a high RIDF are domain-specific phrases and have distributions that cannot be attributed to a chance occurrence. Second, specific data structures may be created for fast named-entity lookup. For example, after a set of named entities have been identified from the KB articles 108, the named-entity filter 320 builds a graph as a pre-processing step to enable fast lookups. In the graph, nodes denote words and edges connect words if they occur together in a phrase in the set of named entities. For example, given the words [sql, sql server, sql server database, sql server 2005], the final graph includes four nodes (sql, server, database, 2005), an edge from sql-<server, server-<database, and server-<2005. The process of constructing the graph is described in more detail in FIG. 4. Third, the graph is used to perform named-entity recognition during creation of the index.

By performing synonym expansion during the index building phase, query latency may be reduced. In addition, the synonyms for technical words rarely change, so storing the synonyms in an index (e.g., the inverted index 114) does not require that the index be frequently recreated to incorporate new synonyms. The synonym filter 322 operates in a manner similar to the named-entity filter 322, except that upon finding a token with synonyms, all synonyms are added to the DFWA and the positional value of the synonyms is set to the positional value of the original token.

To account into consideration general words in a language, synonyms from a lexical database, such as WordNet®, may be added using a lexical database (DB) filter 324. Note that the synonym filter 322 is typically used after the named-entity filter 320 to prevent incorrect synonym expansion.

Normalization 326 may be performed to reduce words into their root forms so that different forms of a root word are equivalent. For example, the terms upgraded, upgrading, and upgrade may all be normalized to a root form, such as 'upgrade,' 'upgrad*,' 'upgrad,' or the like. A stemming filter 328 may be used to identify a stem word of each token. In many cases, the semantic meaning of the word may be more important than the word itself. For example, "upgrading software" and "upgrades to software" are describing the same concept, e.g., software upgrade. Therefore, it is useful to convert words into their root (e.g., stem) form. The stemming filter 328 uses stemming algorithm to remove common morphological and inflexional endings from words (e.g., the words 'connection,' 'connections,' 'connected,' and 'connecting' are all resolved to the stem 'connect') in English.

Query Processing Phase

During the query processing phase (e.g., the online query processing phase 104 of FIG. 1), queries 212 are received. The queries 212 include configuration snapshots (or other information used to perform a search of the KB articles 108). The text of queries 212 is tokenized by the text tokenization to create the token stream 304. Canononicalization 306 is performed on the token stream 304 using the CamelCase filter 308, the value type filter 310, and the lowercase filter 312. The stop word filter 316 may be used to remove stop words (e.g., words like "a", "the" and the like) that do not significantly contribute to the meaning of the queries 212. The resulting tokens are normalized, e.g., using the stemming filter 328, to reduce the tokens to a stem. A search is then performed of the index using the stems that are derived from the tokens.

Figure 4:
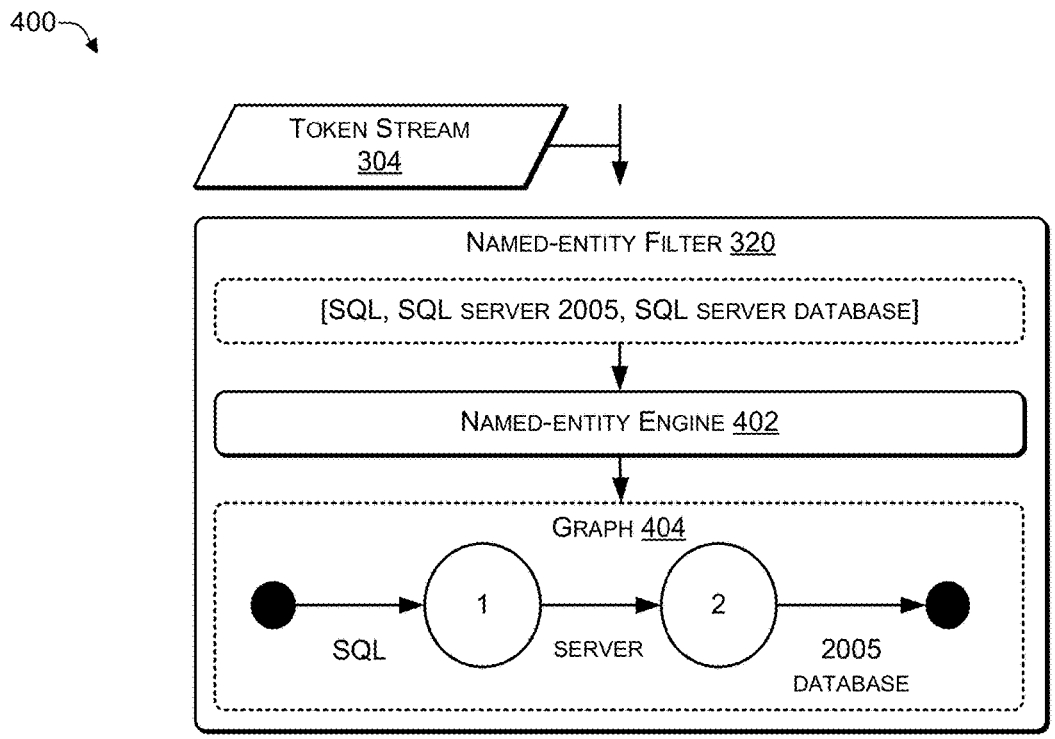
FIG. 4 is an illustrative system to perform named-entity recognition according to some implementations.
Figure 4:
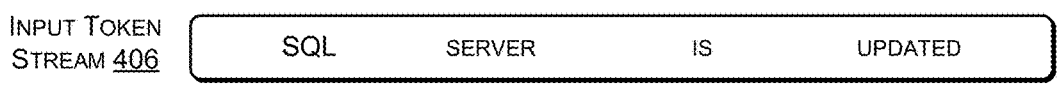
Figure 4:
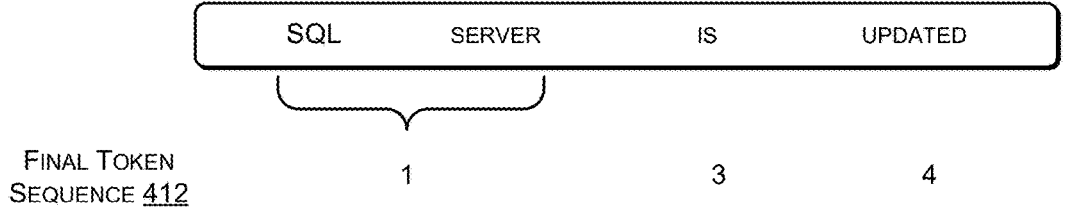

FIG. 4 is an illustrative system 400 to perform named-entity recognition according to some implementations. The process described in FIG. 3 includes processing technical articles (e.g., the KB articles 108 of FIG. 1) to identify a list of named entities. The named-entity filter 320 builds a graph during the offline index building phase 102 to enable fast lookups during runtime (e.g., the online query processing phase 104). For example, a named-entity engine 402 may be used to create a graph 404. In the graph 404, each node represents a word and each edge connects words that occur together in a phrase in the named-entity list. For example, the token stream 304 may include the phrase "SQL server is updated." The named-entity filter 320 identifies the named entities [sql, sql server, sql server database, sql server 2005]. The graph 404 includes four nodes (sql, server, database, 2005), and edges from sql-<server, server-<database, and server-<2005.

The graph 404 may be used to perform named-entity recognition when the index is being created. During indexing, for each token, a determination is made as to whether the token exists as a named-entity, e.g., whether the graph includes a node having the token string as its value. If the graph includes the node having the token string as its value, then a determination is made whether a next token exists as a neighbor of the token string in the graph. If the next token exists, then the next token is concatenated with the token (e.g., the previous token) and pushed onto a stack. This process is continued as long as the next token exists as a neighbor of the previous token. When a next token does not exist, the stack is popped and the concatenated string is given the same position as the first entry in the stack. For example, an input token stream 406 may include "SQL server is updated." An original token sequence 408 is shown in FIG. 4. Named-entity recognition 410 is performed and in a final token sequence 412, the positional information of "server" is set to that of "sql."

Example Processes

In the flow diagrams of FIGS. 5, 6, 7, 8, and 9 each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 5, 6, 7, 8, and 9 are described with reference to the architectures/systems 100, 200, 300, and 400, as described above, although other models, frameworks, systems and environments may implement these processes.

Figure 5:
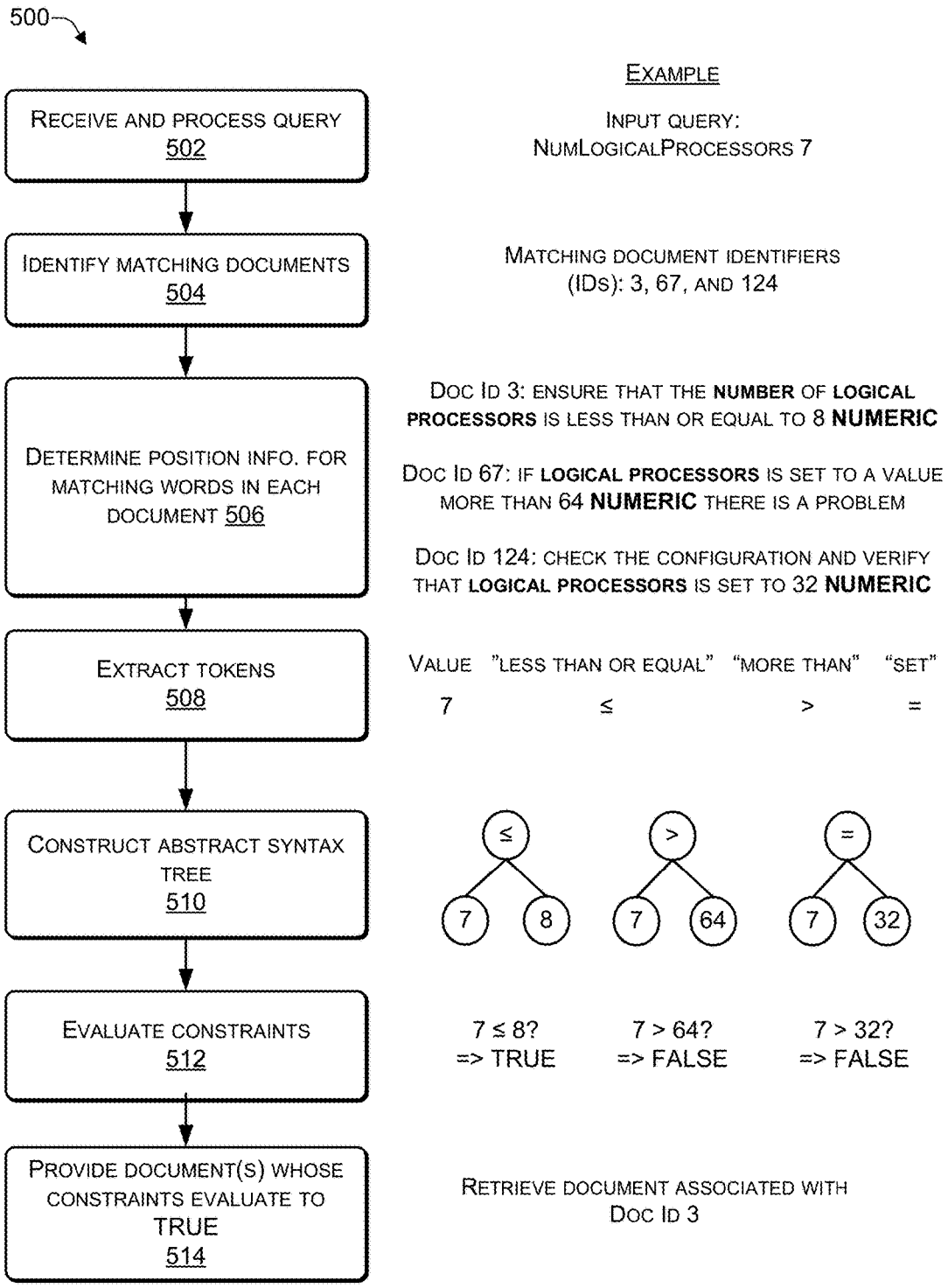
FIG. 5 is a flow diagram of a process to perform constraint evaluation according to some implementations.

FIG. 5 is a flow diagram of a process 500 to perform constraint evaluation according to some implementations. The process 500 may be performed during the online query processing phase 104.

At 502, a query is received and processed. For example, in FIG. 1, the query 120 is processed using query processing 122. To illustrate, query analysis may be performed for the query "NumOfLogicalProcessors 7" using at least a portion of the filters from FIG. 3 (e.g., the synonym expansion 318 and the normalization 326 may not be used) to obtain "num logical processor 7." The value-type "7" in the query is extracted into a separate field and substituted with the generic term "NUMERIC."

At 504, documents matching terms in the query are identified. For example, in FIG. 1, a proximity search is performed using the generic query "num logical processor NUMERIC" and the relevant document identifiers are retrieved. For example, three documents, with document identifiers (IDs) 3, 67, and 124 may be identified.

At 506, position information may be determined for each matching word in each of the documents may be determined. The positional information along with the text between the positional offsets is obtained for each match from the index (e.g., the inverted index 114 of FIG. 1).

At 508, tokens may be extracted by passing each match through a token extraction module. The token extraction module parses the natural text and constructs corresponding token representations. For example, "less than" is represented by the token "<," "seven" is represented by "7," "greater than" is represented by ">," etc. The token extraction module may use two pieces of information: (1) frequently-used comparative expressions in natural text (e.g., 'less than or equal to,' 'set to,' 'greater than,' and the like) and (2) a simple type system to determine (e.g., infer) values (e.g., numerical, Boolean, floating point, version numbers, enumerated sets and the like). Using these two pieces of information, the token extraction module may extract comparative expressions along with any surrounding values. For example, the tokens "7" along with "≤," ">" and "=" may be extracted from the documents with Doc. IDs. 3, 67, and 124.

At 510, an Abstract Syntax Tree (AST) is constructed for individual expressions to be evaluated. An AST is constructed, with the leaves representing the values that are to be compared, and the root node representing the type of operation (e.g., <, >, =, etc.) to be executed on the leaves. The ASTs for the DOC. IDs. 3, 67, and 124 are illustrated in FIG. 5.

At 512, the constraints may be evaluated. For example, the ASTs may be compiled in-memory and evaluated to obtain a truth condition. Matches satisfying the truth condition are returned for subsequent ranking. In some cases, the truth condition evaluation may be performed "on the fly," e.g., substantially in real time.

At 514, the document(s) whose constraints evaluate to TRUE are provided for subsequent ranking. In this example, the document corresponding to document identifier 3, whose constrains evaluate to TRUE, are retrieved and provided for ranking (e.g., by the ranking engine 140).

Figure 6:
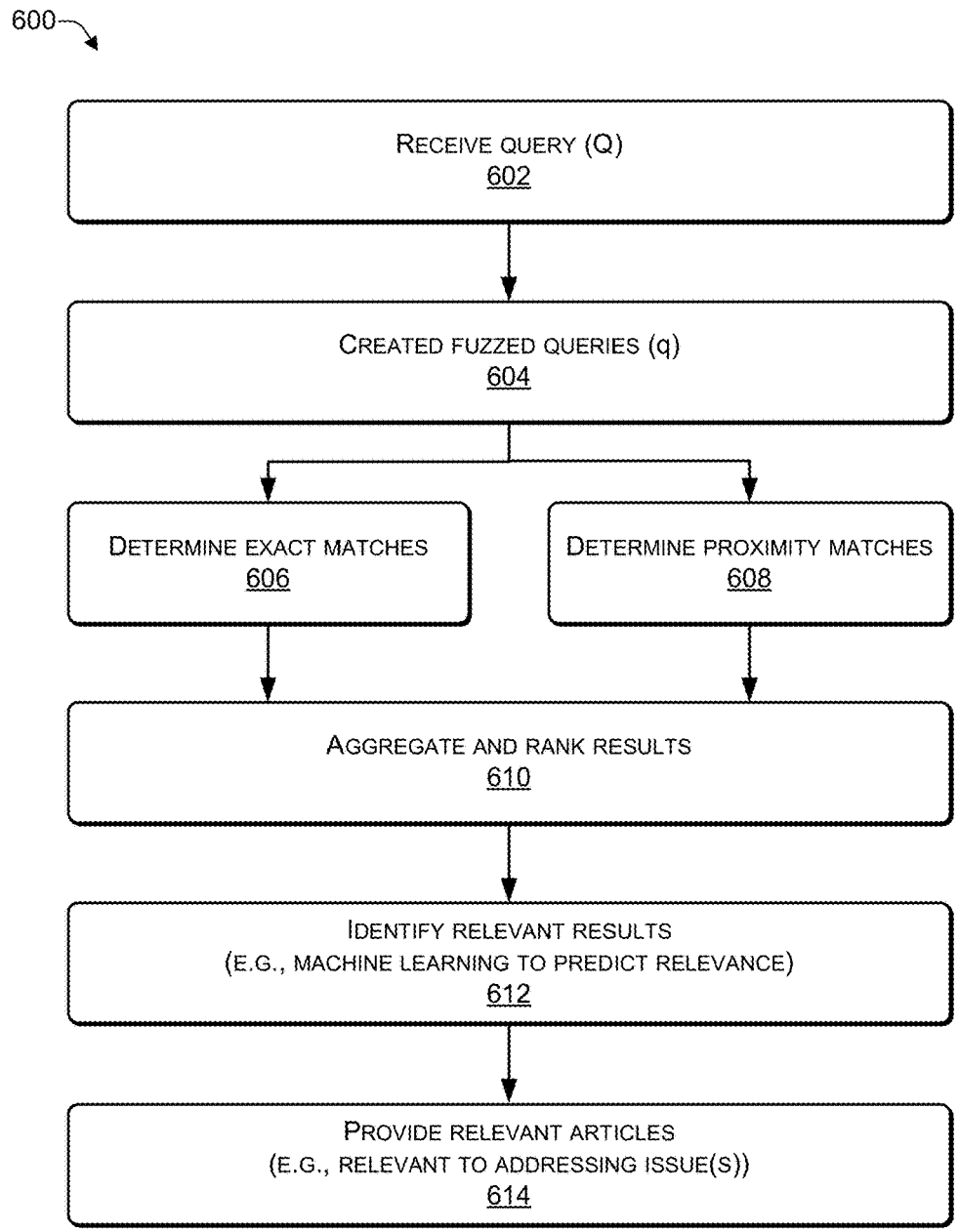
FIG. 6 is a flow diagram of a process to extract relevant queries according to some implementations.

FIG. 6 is a flow diagram of a process 600 to extract relevant queries according to some implementations. The process 600 may be performed during the online query processing phase 104 and the online learning phase 106 of FIG. 1.

At 602, a query Q is received. At 604, the query Q is "fuzzed" to create one or more fuzzy queries. For example, in FIG. 1, the query processing 122 may receive the query 120 and perform the query fuzzing 128 to created fuzzed queries.

At 606, exact matches (e.g., for the query and the fuzzed queries) may be determined. At 608, proximity matches (e.g., for the query and the fuzzed queries) may be determined. For example, in FIG. 1, the query 120 and the fuzzed queries may be distributed to multiple matching engine 132, such as the exact match engine 134 and the proximity match engine 136, to determine exact matches and proximity matches.

At 610, the results from the matching engines may be aggregated and ranked. For example, in FIG. 1 the ranking engine 140 may aggregate and rank the output of the matching engines 132 to create the ranked results 142.

At 612, relevant results may be identified, e.g., by determining a relevancy score for individual documents included in the results. At 616, relevant articles (e.g., relevant to addressing a particular issue, such as a configuration issue) may be provided. For example, in FIG. 1, the classifier 144 may identify relevant items from the ranked results 142 (e.g., and discard non-relevant items to produce the results 146).

Figure 7:
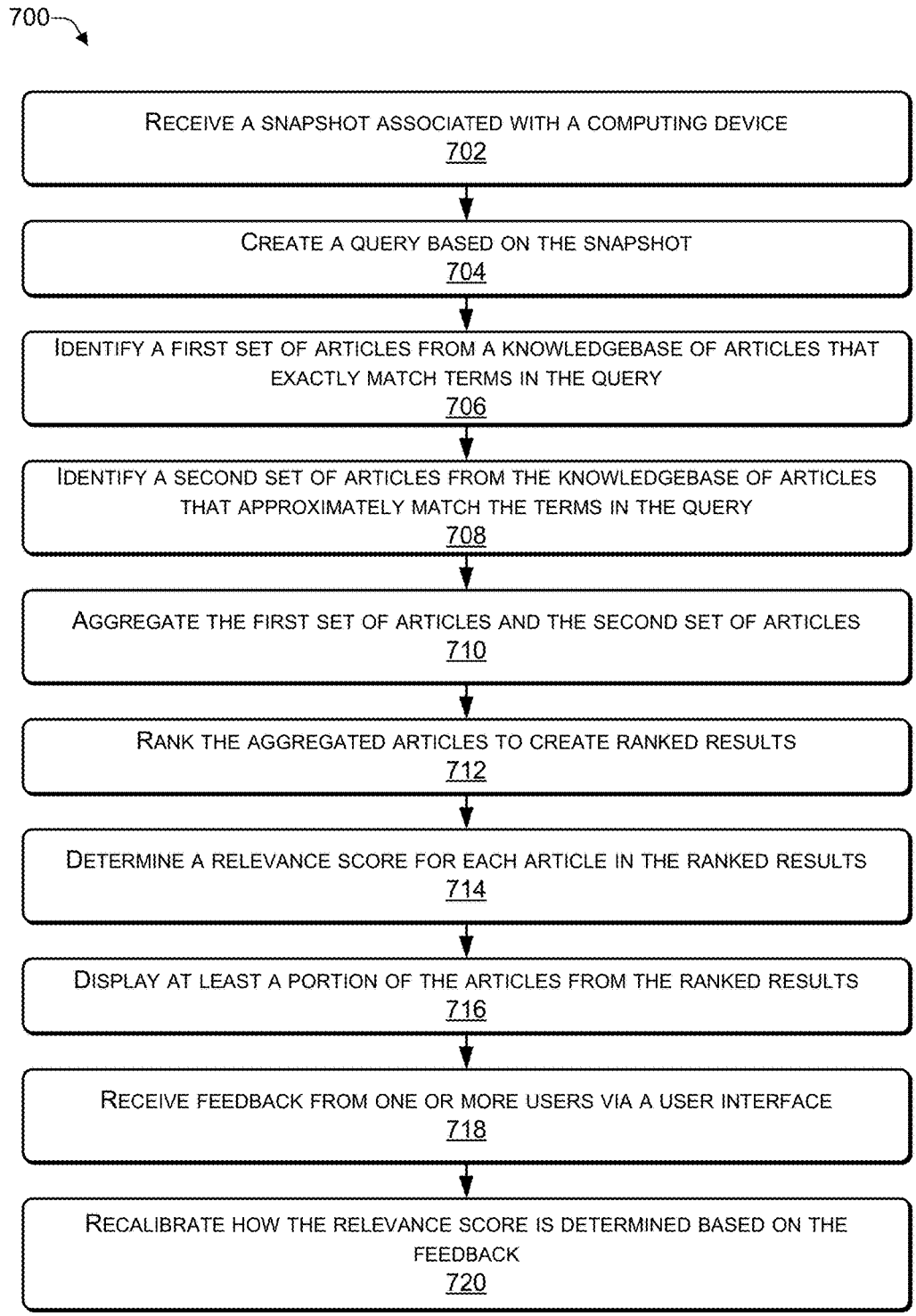
FIG. 7 is a flow diagram of an example process that includes creating a query based on a snapshot according to some implementations.
Figure 8:
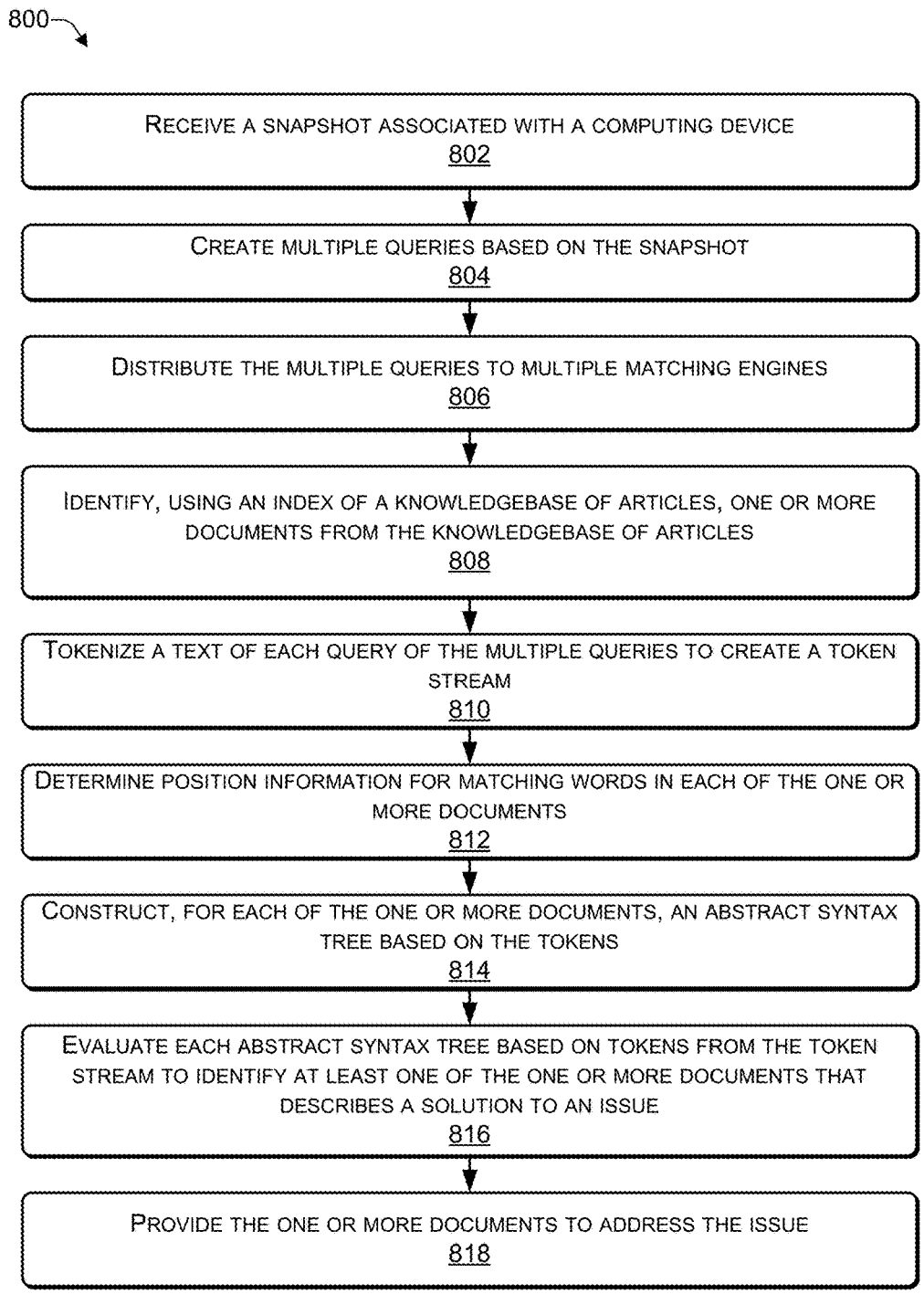
FIG. 8 is a flow diagram of an example process that includes creating multiple queries based on a snapshot according to some implementations.
Figure 9:
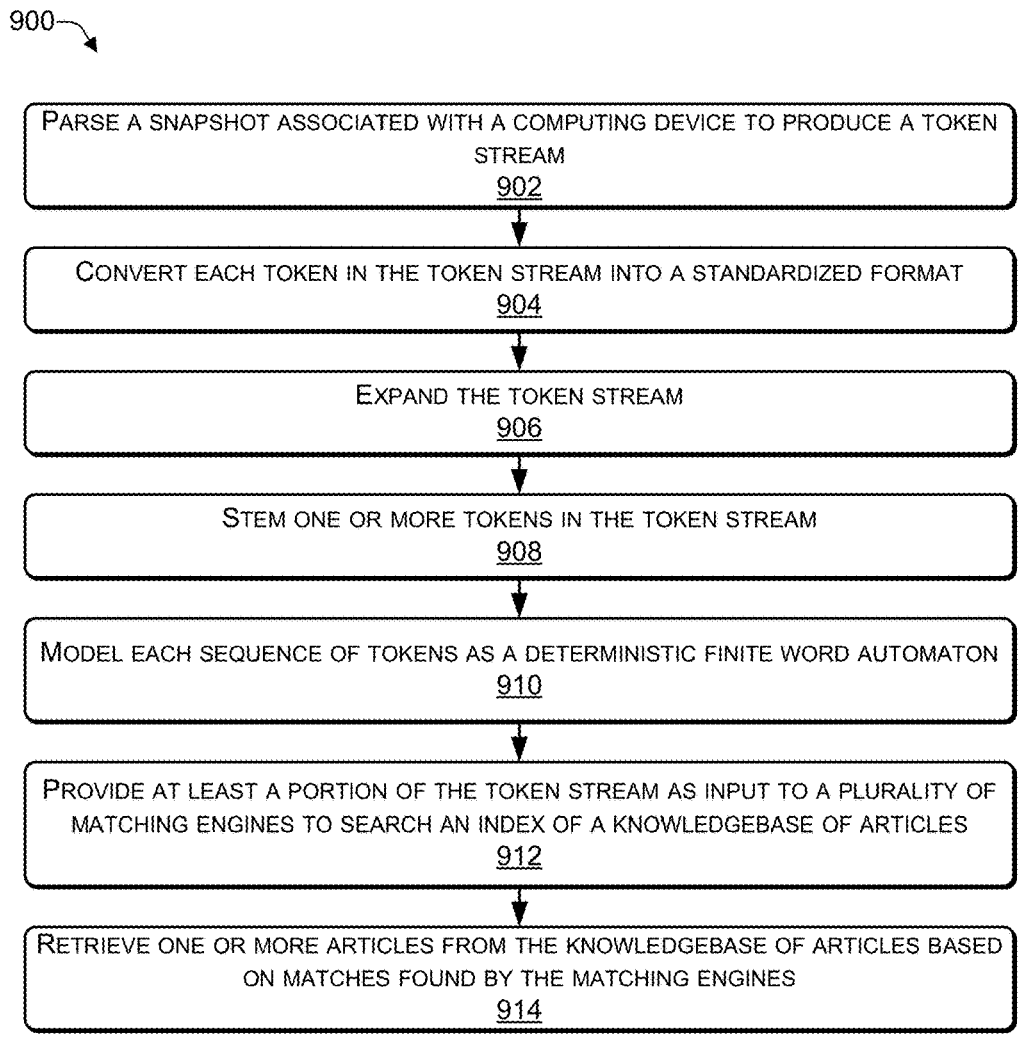
FIG. 9 is a flow diagram of an example process that includes parsing a snapshot associated with a computing device according to some implementations.

FIG. 7 is a flow diagram of an example process 700 that includes creating a query based on a snapshot (e.g., data associated with a computing device) according to some implementations. The process 700 may be performed by the detector 202 of FIG. 2. While the processes in FIGS. 7, 8, and 9 are described using an example of a snapshot of a computing device that has a configuration issue, the systems and techniques described here may be applied to identify technical articles from a knowledge base in other situations, including identifying articles with solutions to other types of issues.

At 702, a snapshot (e.g., data) associated with a computing device that has a configuration issue is received. At 704, a query is created based on the snapshot. For example, in FIG. 2, the detector 202 may receive the configuration snapshots 206 from one or more computing devices at the customer site 204 and create the queries 212 to identify the suggested fixes 208 from the KB articles 108. In some cases, the snapshots may include error logs, a memory dump (e.g., contents of memory when a problem occurred), registry files, or other information associated with the computing device.

At 706, a first set of articles that exactly match terms in the query are identified from a knowledge base of articles. At 708, a second set of articles that approximately match terms in the query are identified from the knowledge base of articles. At 710, the first set of articles and the second set of articles are aggregated. At 712, the aggregated articles are ranked to create ranked results. For example, the ranking engine 140 may aggregate a first set of articles from the exact match engine 134 and a second set of articles from the proximity match engine 136 and then rank the aggregated set of articles to produce the ranked results 142.

At 714, a relevance score of each of the articles in the ranked results is determined. For example, articles with a relevance score below a predetermined threshold may be discarded from the ranked results. At 716, at least a portion of the articles from the ranked results are displayed. At 720, user feedback is received via a user interface. At 722, how the relevancy scores are determined is recalibrated based on the user feedback to refine subsequent relevancy scores. For example, in FIG. 1, the classifier 144 may determine a relevance score for each of the ranked results 142, discard articles with relevance scores lower than a predetermined threshold, and display the remaining articles in the results 146. The user feedback 150 may be received via the user interface 148 and the classifier 144 recalibrated based on the user feedback 150.

Thus, a detector may receive a snapshot that includes parameter key-value pairs of a configuration of a computing device. The detector may parse the configuration snapshot and create multiple queries. The detector may distribute the multiple queries to multiple matching engines that search an index of a knowledge base of articles to identify articles that include solutions (rather than merely informative articles) to a configuration issue of the computing device.

FIG. 8 is a flow diagram of an example process 800 that includes creating multiple queries based on a snapshot according to some implementations. The process 800 may be performed by the detector 202 of FIG. 2.

At 802, a snapshot (e.g., information) associated with a computing device that has a configuration issue is received. At 804, multiple queries are created based on the snapshot. For example, in FIG. 2, the detector 202 may receive the configuration snapshots 206 from one or more computing devices at the customer site 204 and create the queries 212 to identify the suggested fixes 208 from the KB articles 108. In some cases, the snapshots may include error logs, a memory dump (e.g., contents of memory when a problem occurred), registry files, or other information associated with the computing device.

At 806, the multiple queries are distributed to multiple matching engines (e.g., including an exact match engine and a proximate match engine). For example, in FIG. 1, the query distributor 130 may distribute multiple queries produced by the query processing 122 to the matching engines 132.

At 808, one or more documents are identified from a knowledge base of articles using an index to the knowledge base. For example, in FIG. 1, the matching engines 132 use the inverted index 114 to identify matching articles are aggregated and ranked by the ranking engine 140. The process of identifying one or more documents from the knowledge base of articles is described in more detail in 810, 812, 814, and 816.

At 810, a text of each query may be tokenized to create a token stream. At 812, position information for matching words in each of the documents may be determined. At 814, based on the tokens, an abstract syntax tree may be created for each of the documents. At 816, each abstract syntax tree may be evaluated to identify at least one of the documents that describes a solution to the configuration issue. For an example, see FIG. 5 and the accompanying description.

At 818, the one or more documents are provided as candidate solutions to the configuration issue. For example, in FIG. 1, the results 146 are provided as candidate solutions.

Thus, a detector may receive a snapshot that includes parameter key-value pairs of a configuration of a computing device. The detector may parse the snapshot and create multiple queries. The detector may distribute the multiple queries to multiple matching engines that search an index of a knowledge base of articles to identify articles that match a configuration issue of the computing device. The matching articles may be tokenized and abstract syntax trees constructed and evaluated using the resulting tokens to identify which of the matching articles include solutions (e.g., rather than merely information) to solve the configuration issue of the computing device.

FIG. 9 is a flow diagram of an example process that includes parsing a configuration snapshot associated with a computing device according to some implementations. The process 900 may be performed by the detector 202 of FIG. 2.

At 902, a snapshot (e.g., data) associated with a computing device is parsed to create a token stream. At 904, each token is converted into a standardized format. At 906, the token stream is expanded. For example, in FIG. 2, the configuration snapshots 206 are parsed to create the queries 212. In FIG. 3, the queries 212 are tokenized to create the token stream 304. The token stream may be expanded to include synonyms of the tokens.

At 908, one or more of the tokens in the token stream are stemmed. For example, in FIG. 3, the stemming filter 328 may be used to stem at least one of the tokens in the token stream 304.

At 910, each sequence of tokens is modeled as a deterministic finite word automaton. For example, in FIG. 4, the graph 404 is created after parsing the token stream 304.

At 912, at least a portion of the token stream is provided as an input to a plurality of matching engines to search an index of a knowledge base of articles. For example, in FIG. 1, the query distributor 130 distributes queries to the matching engines 132.

At 914, one or more articles are retrieved from the knowledge base of articles based on matches found by the matching engines. For example, in FIG. 2, the suggested fixes 208 are provided based on the configuration snapshots 206.

Thus, a detector may receive a snapshot (e.g., information) that includes parameter key-value pairs of a configuration of a computing device. The detector may parse the configuration snapshot to produce a stream of tokens. The tokens may be converted into a standardized format and expanded upon by adding synonyms of the tokens to the token stream. Each sequence of tokens may be modeled as a deterministic finite word automaton. The detector may distribute multiple queries to multiple matching engines that search an index of a knowledge base of articles to identify articles that match a configuration issue of the computing device. The matching articles may include solutions (e.g., rather than merely information) to solve the configuration issue of the computing device.

Example Computing Device and Environment

Figure 10:
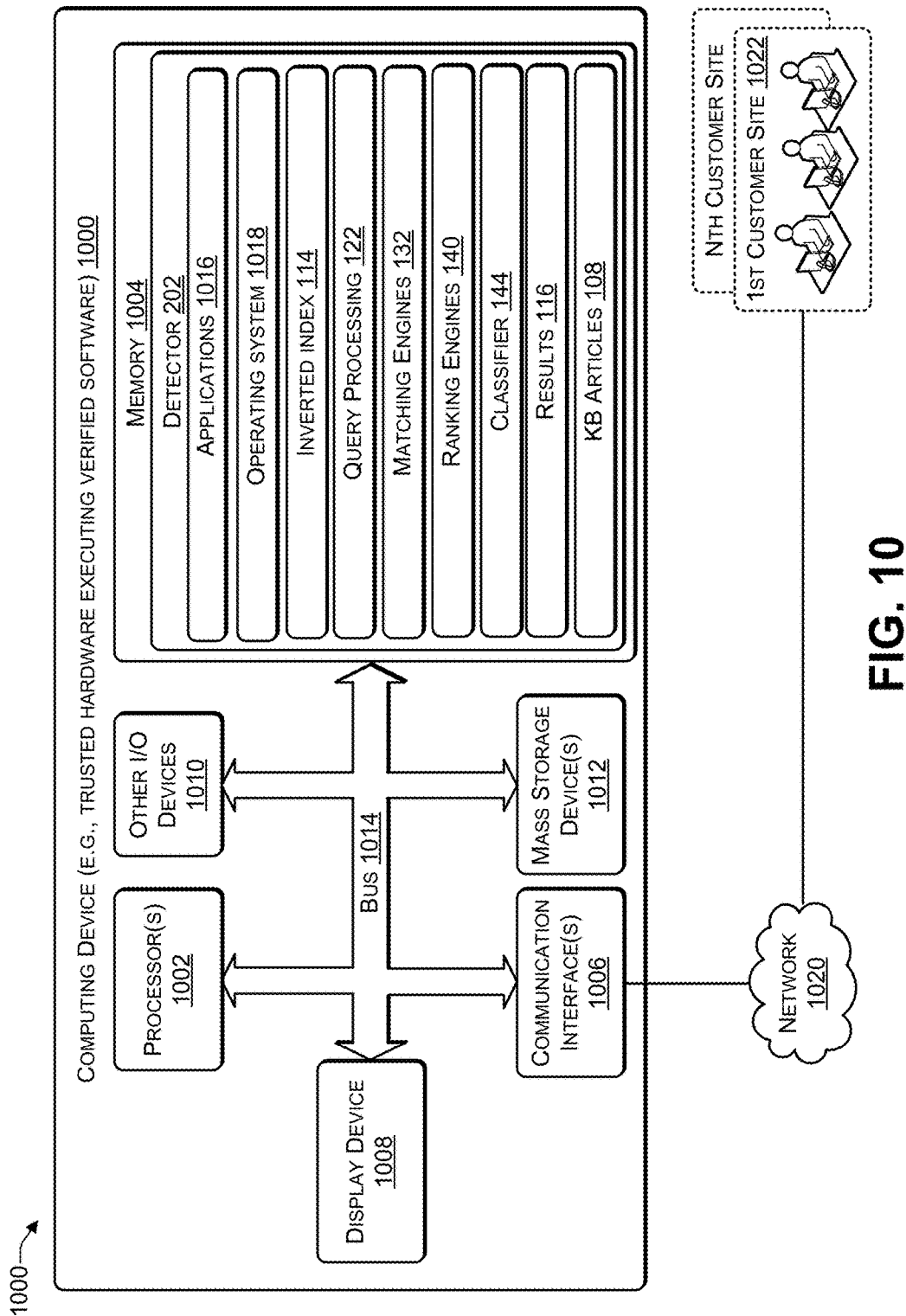
FIG. 10 illustrates an example configuration of a computing device and environment that can be used to implement the modules, functions, and techniques described herein.

FIG. 10 illustrates an example configuration of a computing device 1000 (e.g., a server that hosts the detector 202) and environment that can be used to implement the modules and functions described herein. The computing device 1000 may include at least one processor 1002, a memory 1004, communication interfaces 1006, a display device 1008, other input/output (I/O) devices 1010, and one or more mass storage devices 1012, able to communicate with each other, such as via a system bus 1014 or other suitable connection.

The processor 1002 may be a single processing unit or a number of processing units, all of which may include single or multiple computing units or multiple cores. The processor 1002 can be implemented as one or more microprocessors, microcomputers, microcontrollers, digital signal processors, central processing units, state machines, logic circuitries, and/or any devices that manipulate signals based on operational instructions. Among other capabilities, the processor 1002 can be configured to fetch and execute computer-readable instructions stored in the memory 1004, mass storage devices 1012, or other computer-readable media.

Memory 1004 and mass storage devices 1012 are examples of computer storage media for storing instructions which are executed by the processor 1002 to perform the various functions described above. For example, memory 1004 may generally include both volatile memory and non-volatile memory (e.g., RAM, ROM, or the like). Further, mass storage devices 1012 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 1004 and mass storage devices 1012 may be collectively referred to as memory or computer storage media herein, and may be a non-transitory media capable of storing computer-readable, processor-executable program instructions as computer program code that can be executed by the processor 1002 as a particular machine configured for carrying out the operations and functions described in the implementations herein.

The computing device 1000 may also include one or more communication interfaces 1006 for exchanging data with other devices, such as via a network, direct connection, or the like, as discussed above. The communication interfaces 1006 can facilitate communications within a wide variety of networks and protocol types, including wired networks (e.g., LAN, cable, etc.) and wireless networks (e.g., WLAN, cellular, satellite, etc.), the Internet and the like. Communication interfaces 1006 can also provide communication with external storage (not shown), such as in a storage array, network attached storage, storage area network, or the like.

A display device 1008, such as a monitor may be included in some implementations for displaying information and images to users. Other I/O devices 1010 may be devices that receive various inputs from a user and provide various outputs to the user, and may include a keyboard, a remote controller, a mouse, a printer, audio input/output devices, and so forth.

Memory 1004 may include modules and software components that can be used to identify, from a knowledge base of articles, one or more documents that include a solution to a particular problem, such as configuration issue. For example, the memory 1004 may include applications 1016, an operating system 1018, the inverted index 114 (or another type of index), the query processing 122, the matching engines 132, the ranking engines 140, the classifier 144, the results 116, the KB articles 108 (or other documents), and other types of applications and data as described herein.

Trained Classifier

Figure 11:
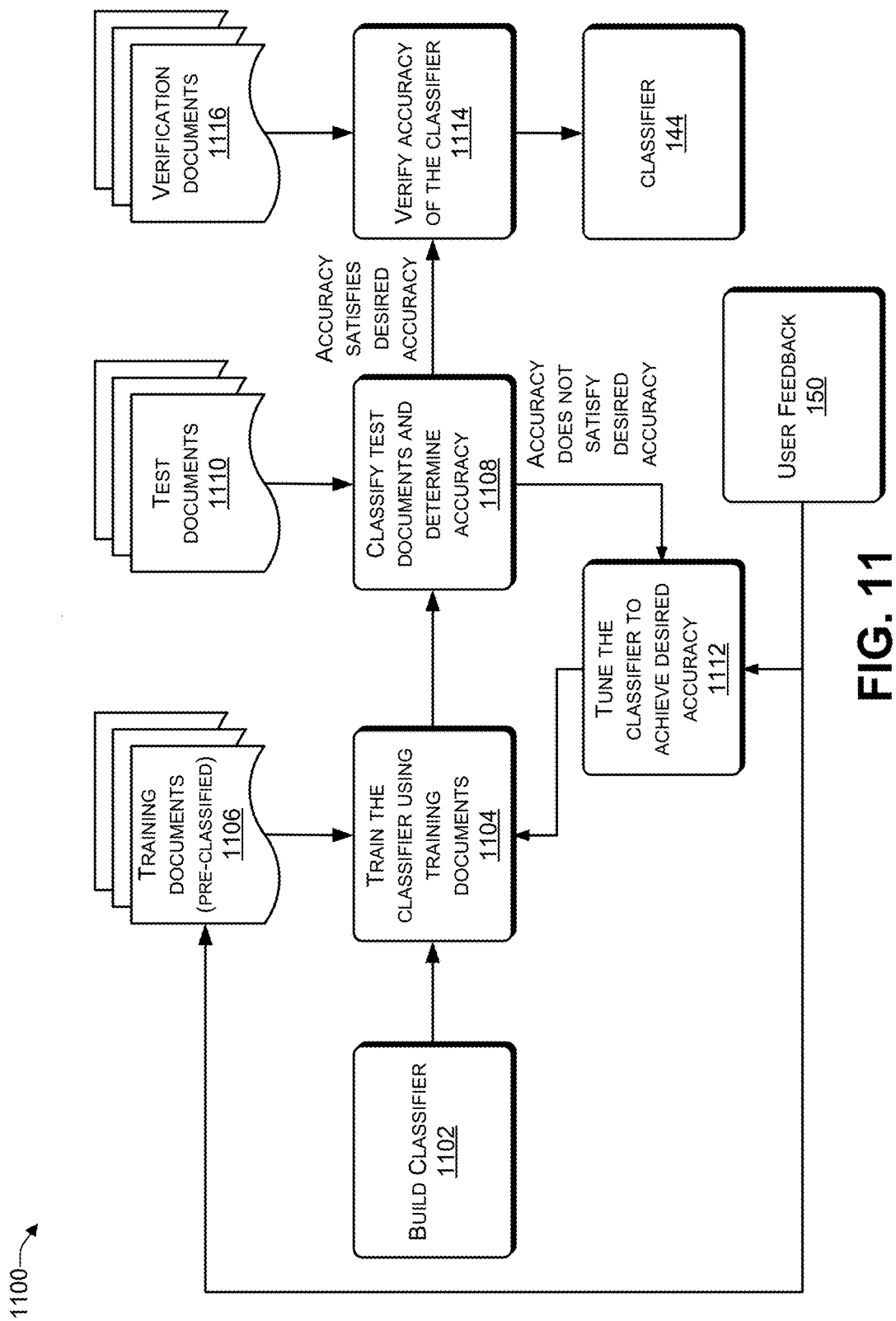
FIG. 11 shows an illustrative process to build and train a classifier according to some implementations.

FIG. 11 shows an illustrative process 1100 to build and train the classifier 144 of FIG. 1. At block 1102, the classifier is built. For example, software instructions that implement one or more algorithms may be written to build the classifier 144. The algorithms may implement machine learning, pattern recognition, and other types of algorithms, such as a support vector machine.

At block 1104, the classifier may be trained using training documents 1106. The training documents 1106 may include documents that have been pre-classified by a human, e.g., an expert.

At block 1108, the classifier may be instructed to classify test documents 1110. The test documents 1110 may have been pre-classified by a human, by another classifier, or a combination thereof. An accuracy with which the classifier 144 has classified the test documents 1110 may be determined. If the accuracy does not satisfy a desired accuracy, at 1112 the classifier may be tuned to achieve a desired accuracy. The desired accuracy may be a predetermined threshold, such as ninety-percent, ninety-five percent, ninety-nine percent and the like. For example, if the classifier was eighty-percent accurate in classifying the test documents and the desired accuracy is ninety-percent, then the classifier may be further tuned by modifying the algorithms based on the results of classifying the test documents 1110. Blocks 1104 and 1112 may be repeated (e.g., iteratively) until the accuracy of the classifier satisfies the desired accuracy. In addition, the user feedback 150 may be used to tune the classifier (e.g., perform the recalibration 152 of FIG. 1). The user feedback 150 may be added to the training documents 1106.

When the accuracy of the classifier in classifying the test documents 1110 satisfies the desired accuracy, at 1108, the process may proceed to 1114 where the accuracy of the classifier may be verified using verification documents 1116. The verification documents 1116 may have been pre-classified by a human, by another classifier, or a combination thereof. The verification process may be performed at 1114 to determine whether the classifier exhibits any bias towards the training documents 1106 and/or the test documents 1110. For example, the verification documents 1116 may be documents that are different from both the test documents 1110 or the training documents 1106. After verifying, at 1114, that the accuracy of the classifier satisfies the desired accuracy, the trained classifier 1118 may be used to classify technical articles. If the accuracy of the classifier does not satisfy the desired accuracy, at 1114, then the classifier may be trained using additional training documents, at 1104. For example, if the classifier exhibits a bias to words from the training documents 1106 and/or the test documents 1110, the classifier may be training using additional training documents to reduce the bias.

Thus, the classifier 144 may be trained using training documents and tuned to satisfy a desired accuracy. After the desired accuracy of the classifier 144 has been verified, the classifier 144 may be used to determine a relevancy score of technical articles identified by the matching engines and to remove articles whose relevancy score does not satisfy a predetermined threshold.

Creating and Filtering A DFWA

FIG. 12 shows an illustrative process 1200 to create and filter a deterministic finite word automaton (DFWA) according to some implementations. At 1202, a DFWA is constructed (e.g., using a knowledge base article). At 1206, a state S is added. At 1208, the process waits to receive a token. At 1210, when no more tokens are received, the DFWA has been created and the process to construct the DFWA ends. For example, the sentence "In SQL, if the number of logical processors is less than or equal to 8, set the InMemory bit to true and use the same number of data files as logical processors" is parsed to create an example of a DFWA, as show in FIG. 12.

At 1204, the DFWA created at 1202 is modified using a filter. For example, a filter may be used to remove punctuation from the DFWA. At 1212, the process proceeds to 1214, to wait to receive a token (e.g., from the DFWA). If a token is received, at 1214, then the token is processed, at 1216. Processing the token includes determining, at 1218, a type of the token and whether a handler exists to handle that type of token. For example, if the token is identified as a type of punctuation, and a punctuation handler exists, then the state may be removed from the DFWA. The steps 1214, 1216, and 1218 may be repeated until the tokens in the DFWA have been processed (e.g., filtered), and the process ends, at 1220. An example of a DFWA that has been modified by a punctuation filter is illustrated in FIG. 12.

In FIG. 5, a pipeline of filters is used to extract tokens from KB articles for indexing. To extract the tokens, a sequence of text from a KB article is parsed as a DFWA. The DFWA includes a finite set of states Q (e.g., representing token positions), and a transition function d that takes as arguments a state and an input symbol and returns a state. Given a term sequence DFWA, text tokenization is performed where additional filtering such as discarding punctuation, removing accents from characters, or changing words into the basic form (lemmatizing) is performed. The final terms extracted after applying tokenization on a stream of text are called tokens. The filtering process can be viewed as a sequential transformation of a DFWA, e.g., each filter may modify the DFWA using one of two operations: expansion or pruning of either the states or the transition function. FIG. 6 illustrates how a DFWA is constructed from an example sentence and passed through a punctuation filter to remove punctuation. Note that after 1204 is performed, the "comma" and "period" have been removed from the DFWA and the transition function has been modified to reflect the transition to a new state, e.g., after state 2, encountering the word "if" will transition the DFWA to state 4.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

As used herein, "computer-readable media" includes computer storage media and communication media. Computer storage media includes volatile and non-volatile, removable and non-removable media implemented in any method or technology for storage of information, such as computer readable instructions, data structures, program modules, or other data. Computer storage media includes, but is not limited to, random access memory (RAM), read only memory (ROM), electrically eraseable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave. As defined herein, computer storage media does not include communication media.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations," "an example," "some examples," "some implementations" or the like means that a particular feature, structure, or characteristic described is included in at least one implementation or example, and the appearances of these phrases in various places in the specification are not necessarily all referring to the same implementation. Unless otherwise indicated, the various implementations and examples provided are not intended to be mutually exclusive and may be used individually or in combination with one another.

Examples

One or more computer-readable storage media store instructions that, when executed by one or more processors, program the one or more processors to perform operations including receiving a configuration snapshot associated with a computing device that has a configuration issue. The configuration snapshot includes one or more parameter key-value pairs. Each of the one or more parameter key-value pairs includes a configuration parameter associated with the computing device and a corresponding value of the configuration parameter. The operations further include creating a query based on the configuration snapshot. The query may be created based on the configuration snapshot by: (i) parsing a content of the configuration snapshot to create a stream of tokens, (ii) normalizing individual tokens in the stream of tokens to create normalized tokens, (iii) removing stop words from the normalized tokens to create truncated tokens, (iv) performing synonym expansion on individual tokens of the truncated tokens to create expanded tokens, (v) stemming individual tokens from the expanded tokens to create normalized tokens, and (vi) creating the query based on the normalized tokens. The operations also include identifying a first set of articles from a knowledge base of articles that exactly match terms in the query. The operations also include identifying a second set of articles from the knowledge base of articles that approximately match the terms in the query. Identifying the second set of articles is performed contemporaneously with identifying the first set of articles. The operations further include aggregating the first set of articles and the second set of articles to create aggregated articles. In addition, the operations include ranking the aggregated articles to create ranked results and providing the ranked results. The operations include determining, using a trained classifier, a relevance score for each article in the ranked results. The operations further include discarding at least one article from the ranked results based on the relevance score of the at least one article. The operations also include displaying a remainder of the articles from the ranked results, receiving feedback for the remainder of the articles from one or more users via a user interface, and recalibrating the trained classifier based on the feedback.

A server may include one or more processors and one or more computer-readable storage media storing instructions executable by the one or more processors to perform various operations. The server receives a configuration snapshot associated with a computing device. The computing device has a configuration issue. The server creates multiple queries based on the configuration snapshot and distributes the multiple queries to multiple matching engines, including an exact matching engine to identify exact matches to words in the multiple queries and a proximate matching engine to identify approximate matches to the words in the multiple queries. The text of each query of the multiple queries is tokenized to create a token stream. Tokens in the token stream are normalized using at least one of a CamelCase filter, a Value Type filter, or a lowercase filter. A stop word filter is used to remove stop words from the token stream. The token stream is expanded to include one or more synonyms associated with at least one of the tokens from the token stream. The server may distribute the multiple queries to the exact matching engine while (e.g., at about the same time as) the server may distributes the multiple queries to the proximate matching engine. Using an index of a knowledge base of articles, the server identifies one or more documents from the knowledge base of articles that include key words from each of the multiple queries. The server determines position information for matching words in each of the one or more documents, constructs, for each of the one or more documents, an abstract syntax tree based on the tokens, and evaluates each abstract syntax tree based on tokens from the token stream to identify at least one of the one or more documents that describes a solution to the configuration issue. The server provides the one or more documents as candidate solutions to the configuration issue.

A computer-implemented method includes parsing a configuration snapshot associated with a computing device to produce a token stream. The configuration snapshot includes parameter key-value pairs associated with a configuration of the computing device. Each token in the token stream is converted into a standardized format by expanding tokens that are in a CamelCase format into constituent words, detecting a type of at least one token in the token stream, such as detecting whether each token is a numeric type, a Boolean type, a version type, an enumerated set, and converting each token to lowercase. The token stream is expanded by adding one or more synonyms of at least one token in the token stream and by adding fuzzed tokens to the token stream. One or more tokens in the token stream are stemmed to a root form. At least a portion of the token stream is provided as input to a plurality of matching engines to search an index of a knowledge base of articles. One or more articles are retrieved from the knowledge base of articles based on matches found by the matching engines.

Conclusion

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification.

What is claimed is:

1. A computer-implemented method comprising:
   receiving configuration data associated with a configuration state of a computing device;
   creating a query based on the received configuration data, the query corresponding to a technical issue with the computing device;
   converting the query into a normalized form, wherein converting the query into a normalized form includes converting at least one term in the query into a root form of the at least one term;
   identifying a set of documents from a database that match one or more terms in the normalized query, the set of documents including one or both of (i) information associated with the technical issue with the computing device and (ii) information associated with one or more solutions to the technical issue with the computing device;
   determining a relevance score for individual documents of the set of documents;
   providing, in a format suitable for display via at least one graphical user interface, at least a subset of the set of documents based on the relevance score of each of the individual documents to facilitate application of a solution to the technical issue with the computing device, wherein the subset of the set of documents is provided so as to prompt one or more users for feedback on the subset of the set of documents; and
   in response to receiving feedback from one or more users via the at least one graphical user interface, adjusting the subset of the set of documents based on the received feedback, wherein adjusting the subset of the set of documents based on the received feedback from the one or more users includes recalibrating using a trained classifier how subsequent relevance scores for individual documents are determined based on the received feedback.

2. The computer-implemented method as in claim 1, wherein identifying the set of documents from the database that match one or more terms in the normalized query comprises at least one of:
   identifying the set of documents from the database that exactly match one or more terms in the normalized query; and
   identifying the set of documents from the database that approximately match one or more terms in the normalized query.

3. The computer-implemented method as in claim 1, wherein the database comprises pre-processed documents and corresponding metadata that is included in an index to access the pre-processed documents.

4. The computer-implemented method as in claim 1, wherein the configuration data includes one or more parameter key-value pairs, each of the one or more parameter key-value pairs including a configuration parameter associated with the computing device and a corresponding value of the configuration parameter.

5. The computer-implemented method as in claim 1, wherein creating the query based on the received configuration data comprises at least one of:
   parsing a content of the configuration data to create a stream of tokens;
   normalizing individual tokens in the stream of tokens;
   removing stop words from the stream of tokens;
   performing synonym expansion on individual tokens of the stream of tokens;
   stemming individual tokens from the stream of tokens; and
   creating the query based on the stream of tokens.

6. A server comprising:
   one or more processors; and
   one or more non-transitory computer-readable storage media storing instructions executable by the one or more processors to perform operations comprising:
   receiving configuration data associated with a configuration state of a computing device;
   parsing the received configuration data to create a token stream;
   converting the token stream into a standardized format, wherein converting the token stream into a standardized format includes expanding at least one token from the token stream into multiple tokens corresponding to constituent words of the at least one token;
   creating one or more queries based on one or more tokens from the standardized token stream, the one or more queries corresponding to a configuration issue associated with the computing device;
   distributing the one or more queries to one or more matching engines;
   identifying, using an index of a database of documents, one or more documents from the database of documents that match key words from each of the one or more queries, the one or more documents including one or both of (i) information associated with the configuration issue associated with the computing device and (ii) information associated with one or more candidate solutions to the configuration issue associated with the computing device;
   determining a relevance score of individual documents of the one or more documents;
   providing, in a format suitable for display via at least one graphical user interface, based on the relevance score of each of the individual documents, at least a portion of the one or more documents to facilitate application of the one or more candidate solutions to the configuration issue associated with the computing device, wherein the portion of the one or more documents is provided so as to prompt one or more users for feedback on the portion of the one or more documents; and
   responsive to receiving feedback from one or more users via the at least one graphical user interface, adjusting the portion of the one or more documents based on the received feedback, wherein adjusting the portion of the one or more documents based on the received feedback from the one or more users includes recalibrating using a trained classifier how subsequent relevance scores for individual documents are determined based on the received feedback.

7. The server as in claim 6, wherein distributing the one or more queries to the one or more matching engines comprises:
   distributing one or more queries to an exact matching engine to identify exact matches to words in the one or more queries; and
   distributing the one or more queries to a proximate matching engine to identify approximate matches to the words in the one or more queries.

8. The server as in claim 6, wherein the database includes:
documents processed to extract corresponding metadata; and
an inverted index that is created based on the metadata.

9. The server as in claim 6, wherein the configuration issue associated with the computing device comprises at least one of a performance issue, a security issue, a reliability issue, or a system management issue.

10. The server as in claim 6, the operations further comprising:
determining position information for matching words in each of the one or more documents;
constructing, for each of the one or more documents, an abstract syntax tree based on tokens; and
evaluating each abstract syntax tree based on tokens from the token stream to identify at least one of the one or more documents that describe a solution to an issue.

11. The server as in claim 6, the operations further comprising at least one of:
normalizing tokens in the token stream using at least one of a CamelCase filter, a Value Type filter, or a lowercase filter; or
removing stop words from the token stream using a stop word filter.

12. The server as in claim 6, wherein the relevance score is determined by a machine learning algorithm.

13. The server as in claim 6, the operations further comprising:
expanding a token stream to include one or more synonyms associated with at least one of the tokens from the token stream.

14. A computer-implemented method comprising:
parsing configuration data associated with a configuration state of a computing device to produce a token stream;
converting each token in the token stream into a standardized format, wherein converting each token into a standardized format includes converting the token into multiple tokens corresponding to constituent words of the token;
expanding the token stream based on a configuration issue associated with the computing device;
providing at least a portion of the token stream as input to a plurality of matching engines to search an index of a database of documents;
retrieving one or more documents from the database of documents based on matches found by the plurality of matching engines, each of the one or more documents including a solution to address the configuration issue associated with the computing device;
determining a relevance score for individual documents of the one or more documents; and
providing, in a format suitable for display via at least one graphical user interface, based on the relevance score of each of the one or more documents, at least one document of the one or more documents to facilitate application of a solution to the configuration issue associated with the computing device, wherein the at least one document is provided so as to prompt one or more users for feedback on the at least one document; and
in response to receiving feedback from one or more users via the at least one graphical user interface, adjusting the relevance score of the at least one document based on the received feedback, wherein adjusting the relevance score of the at least one document based on the received feedback from the one or more users includes recalibrating using a trained classifier how subsequent relevance scores for individual documents are determined based on the received feedback.

15. The computer-implemented method as in claim 14, wherein: the configuration data includes parameter-value pairs associated with a configuration parameter of the computing device.

16. The computer-implemented method as in claim 14, wherein the plurality of matching engines comprise at least:
a first matching engine to identify exact matches to at least a first portion of the configuration data; and
a second matching engine to identify approximate matches to at least a second portion of the configuration data.

17. The computer-implemented method as in claim 14, wherein parsing the configuration data associated with a configuration state of the computing device to produce the token stream comprises: modeling each sequence of tokens from the configuration data as a deterministic finite word automaton.

18. The computer-implemented method as in claim 14, wherein expanding the token stream comprises:
fuzzing at least one token in the token stream to create at least one fuzzed token; and
adding the at least one fuzzed token to the token stream.

19. The computer-implemented method as in claim 14, wherein converting each token in the token stream into a standardized format comprises:
detecting a type of at least one token in the token stream, including detecting whether each token is a numeric type, a Boolean type, a version type, or an enumerated set type.

* * * * *